(12) United States Patent  (10) Patent No.: US 8,418,793 B2
Yano et al.  (45) Date of Patent: Apr. 16, 2013

(54) MOTORCYCLE

(75) Inventors: Kengo Yano, Saitama (JP); Mamoru Ito, Saitama (JP); Sadamichi Enjo, Saitama (JP); Fujio Nakamura, Saitama (JP); Naoki Okada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 908 days.

(21) Appl. No.: 12/000,982

(22) Filed: Dec. 19, 2007

(65) Prior Publication Data

US 2008/0156561 A1 Jul. 3, 2008

(30) Foreign Application Priority Data

Dec. 27, 2006 (JP) .................................. 2006-351063
Sep. 19, 2007 (JP) .................................. 2007-242774

(51) Int. Cl.
*B62J 9/00* (2006.01)
*B60R 7/00* (2006.01)
*B62K 11/00* (2006.01)

(52) U.S. Cl.
USPC ....... 180/219; 297/195.13; 224/413; 224/427

(58) Field of Classification Search .................. 180/230, 180/219; 224/413, 427; 296/37.1
See application file for complete search history.

(56) References Cited

U.S. PATENT DOCUMENTS 6,623,071 B2 * 9/2003 Kawamoto et al. ...... 297/195.13
2005/0051374 A1 * 3/2005 Nakano et al. ................ 180/219
2005/0082100 A1 * 4/2005 Sakaki et al. ................. 180/219

FOREIGN PATENT DOCUMENTS

EP 1063155 A2 * 12/2000
EP 1442846 A1 * 8/2004
JP 2001-10572 A 1/2001

* cited by examiner

*Primary Examiner* — Tony H. Winner
*Assistant Examiner* — Jacob Knutson
(74) *Attorney, Agent, or Firm* — Birch, Stewart, Kolasch & Birch, LLP

(57) ABSTRACT

A motorcycle that can facilitate identification of and taking in and out of an article stored below a rear seat includes a storage box that is mounted to a body frame. The front portion of the storage box is covered by a front seat. The rear portion of the storage box is covered by the rear seat and the rear seat is surrounded by the rear spoiler. The rear spoiler has an opening portion that is almost-rectangular as viewed from above. When the rear seat is removed, an article can be put in and taken out from the storage box through the opening portion. A first seal member is attached to the bottom plate of the rear seat, and is pressed against the circumferential edge portion of the opening portion to thereby seal between the rear seat and the rear spoiler.

22 Claims, 19 Drawing Sheets

EMBODIMENT

COMPARATIVE EXAMPLE

EMBODIMENT

COMPARATIVE EXAMPLE

MOTORCYCLE

CROSS-REFERENCE TO RELATED APPLICATIONS

This nonprovisional application claims priority under 35 U.S.C. §119(a) on Patent Application Nos. 2006-351063 and 2007-242744, filed in Japan on Dec. 27, 2006 and Sep. 19, 2007, respectively. The entirety of each of the above-identified applications is incorporated herein by reference.

BACKGROUND OF THE INVENTION

1. Field of the Invention

The present invention relates to a motorcycle in which a storage box is mounted on a body frame. The storage box is covered from the front and the rear by a front seat and a rear seat, respectively.

2. Background of the Invention

A motorcycle according to the background art includes a storage box that is mounted on a body frame. A front portion and rear portion of the storage box are covered by a front seat and a rear seat, respectively, and the rear seat is surrounded by a rear spoiler (see, e.g. Japanese Patent Laid-open No. 2001-10572 (FIG. 15)).

In FIG. 15 of Japanese Patent Laid-open No. 2001-10572, a main seat 72 (hereinafter called the front seat 72) that covers the front of a storage box 23 is provided above the storage box 23 (It is noted that the reference numerals from Japanese Patent Laid-open No. 2001-10572 are being referred to). A rear seat 73 that covers the rear portion of the storage box 23 is provided rearward of the front seat 72. The storage box 23 is provided with a front seat side storage portion 23a below the front seat 72 and with a rear seat side storage portion 23b below the rear seat 73.

In Japanese Patent Laid-open No. 2001-10572, an upper surface portion 23h that forms an upper wall is provided above the rear seat side storage portion 23b. This makes it impossible to reach out from above an article stored in the rear seat side storage portion 23b when the article is being taken out therefrom or put therein. Thus, to take an article in and out, a user has to reach out for the article from the front seat side storage box 23a to the rear seat side storage box 23b.

Since the user extends his or her arm to the rear seat side storage portion 23b, it is cumbersome to take an article in and out in some cases. In addition, since it is necessary to look through the front seat side storage portion to see articles in the rear seat side storage portion, it is difficult to identify an article stored in the rear seat side storage portion 23b.

SUMMARY OF THE INVENTION

It is an object of the present invention to provide a motorcycle that can facilitate identification of and taking in and out of an article stored below a rear seat.

According to an embodiment of the present invention, a motorcycle comprises a body frame; a storage box mounted to the body frame; a front seat covering a front portion of the storage box; a rear seat covering a rear portion of the storage box; and a rear spoiler surrounding the rear seat, wherein the rear spoiler has a generally-rectangular opening portion as viewed from above, when the rear seat is removed, an article can be put in and taken out from the storage box through the opening portion, and a first seal member is attached to a bottom plate of the rear seat, and is pressed against a circumferential edge portion of the opening portion to thereby seal between the rear seat and the rear spoiler.

According to a further embodiment of the present invention, a second seam member is attached to a bottom plate of the front seat, and is pressed against a front portion of the circumferential edge portion and against a circumferential edge formed around the opening of the storage box to thereby seal between the front seat and the storage box.

According to a further embodiment of the present invention, the front seat is provided at a rear portion thereof with a backrest portion projecting upward, the bottom plate of the front seat is formed with a recessed portion hollowed upwardly at a portion corresponding to the backrest portion, the recessed portion receives therein a seat catch member adapted to retain the front seat to the vehicle side, and the seat catch member is disposed inside the second seal member so as to extend obliquely toward the maximum height position of the front seat.

According to a further embodiment of the present invention, the rear portion of the front seat overlaps the front portion of the rear seat and a portion of the second seal member is disposed below the overlapped portion.

According to a further embodiment of the present invention, the first seal member is made of an elastically deformable sponge material and the second seal member is a lipping seal member configured to have a seal lip.

According to a further embodiment of the present invention, the rear spoiler is a foundry piece cast from light metal and has an upper surface which is covered by a spoiler cover also serving as a decorative cover except a portion against which the first seal member is abutted.

According to a further embodiment of the present invention, the rear spoiler surrounding the rear seat is disposed above and near the storage box, and a labyrinth structure seals between the storage box and each of a left portion, a right portion and a rear portion of the rear spoiler, and is disposed at a position substantially overlapping the first seat member as viewed from above.

According to a further embodiment of the present invention, a joint line between a rear end portion of the front seat and a front end portion of the rear seat is formed in an approximate W-shape as viewed from above the vehicle.

According to a further embodiment of the present invention, a rear portion of the front seat is provided integrally with a backrest portion which protrudes upward.

According to an embodiment of the present invention, the rear spoiler has an opening portion almost rectangular as viewed from above. When the rear seat is removed, an article stored or to be stored can be taken out or put in through the opening portion. Since the rear spoiler is provided with the opening portion, the article stored or to be stored below the rear seat through the opening portion can easily be taken out or put in. In addition, an article can easily be identified through the opening portion.

The first seal member is attached to the bottom plate of the rear seat to seal the opening portion. The first seal member is pressed against the circumferential edge portion of the opening portion to seal between the rear seat and the rear spoiler. This can ensure the sealing performance for the opening portion.

According to an embodiment of the present invention, the second seal member is pressed against the front portion of the circumferential edge portion formed around the opening portion and against the circumferential edge formed around the opening of the storage box to seal the opening of the storage box provided below the front seat. Since the front portion of the circumferential portion provided on the rear spoiler concurrently seals the opening of the storage box, the structure of sealing the storage box can be simplified.

According to an embodiment of the present invention, the seat catch member is disposed inside the second seal member. In other words, the second seal member is disposed outside the seat catch member. Therefore, the front seat-below opening portion as the opening of the storage box can be widened to the rearward so that the front seat-below opening portion can be increased in area. Since the area of the opening portion can be increased, an article can further easily be taken out and put in.

A portion corresponding to the backrest portion is made as a recessed portion hollowed upward, in which the seat catch member adapted to retain the front seat on the vehicle body side is housed. Thus, the recessed portion of the backrest portion which is a dead space can effectively be used. The seat catch member is housed in the backrest portion as the dead space; therefore, the storage space of the storage box can largely be ensured.

According to an embodiment of the present invention, the rear portion of the front seat overlaps the front portion of the rear seat and a portion of the first seal member is disposed below the overlapped portion. Thus, sealing performance can be enhanced to further suppress entry of foreign material such as dust into the storage box.

According to an embodiment of the present invention, a lipping seal member as the second seal member is provided for the front seat which is frequently opened and closed. The lipping seal member is configured to have a seal lip. The first seal member made of a convenient and inexpensive sponge material is provided for the rear seat which is less frequently opened and closed than the front seat. Thus, both the front seat and rear seat can ensure predetermined sealing performance while suppressing an increase in vehicle cost.

According to an embodiment of the present invention, the rear spoiler is a foundry piece cast from light metal and has an upper surface which is covered by a spoiler cover also serving as a decorative cover except a portion against which the first seal member is abutted. Thus, when the first seal member is pressed against the abutment portion, the abutment portion can be prevented from being deformed, whereby the predetermined sealing performance can easily be ensured. Since the spoiler cover also serving as a decorative cover is provided on the upper surface of the rear spoiler, the background of the surface of the rear spoiler formed by casting can be covered to thereby improve the external appearance of the rear spoiler.

According to an embodiment of the present invention, the rear spoiler is disposed above and near the storage box, and the labyrinth structure seals between the storage box and each of a left portion, a right portion and a rear portion of the rear spoiler, and is disposed at a position substantially overlapping the first seal member as viewed from above. Thus, the sealing performance between the storage box and the rear spoiler can be ensured, which can effectively enhance the sealing performance for the rear portion of the storage box.

According to an embodiment of the present invention, the joint line between the rear end portion of the front seat and the front end portion of the rear seat is formed in an approximate W-shape as viewed from above the vehicle. Therefore, the meshing between the front seat and the rear seat is satisfactory and the relative position between the front seat and the rear seat can be stabilized. Since the relative position between the seats is stabilized, the sealing performance between the storage box and the seats can further be stabilized.

According to an embodiment of the present invention, the rear portion of the front seat is provided integrally with the backrest portion which protrudes upward, so that the pillion passenger can grip the backrest portion with her or his thighs. Since the upper surface of the backrest portion against which the thighs are abutted is formed as a single wide surface, comfort for the pillion passenger is enhanced to further enhance amenity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
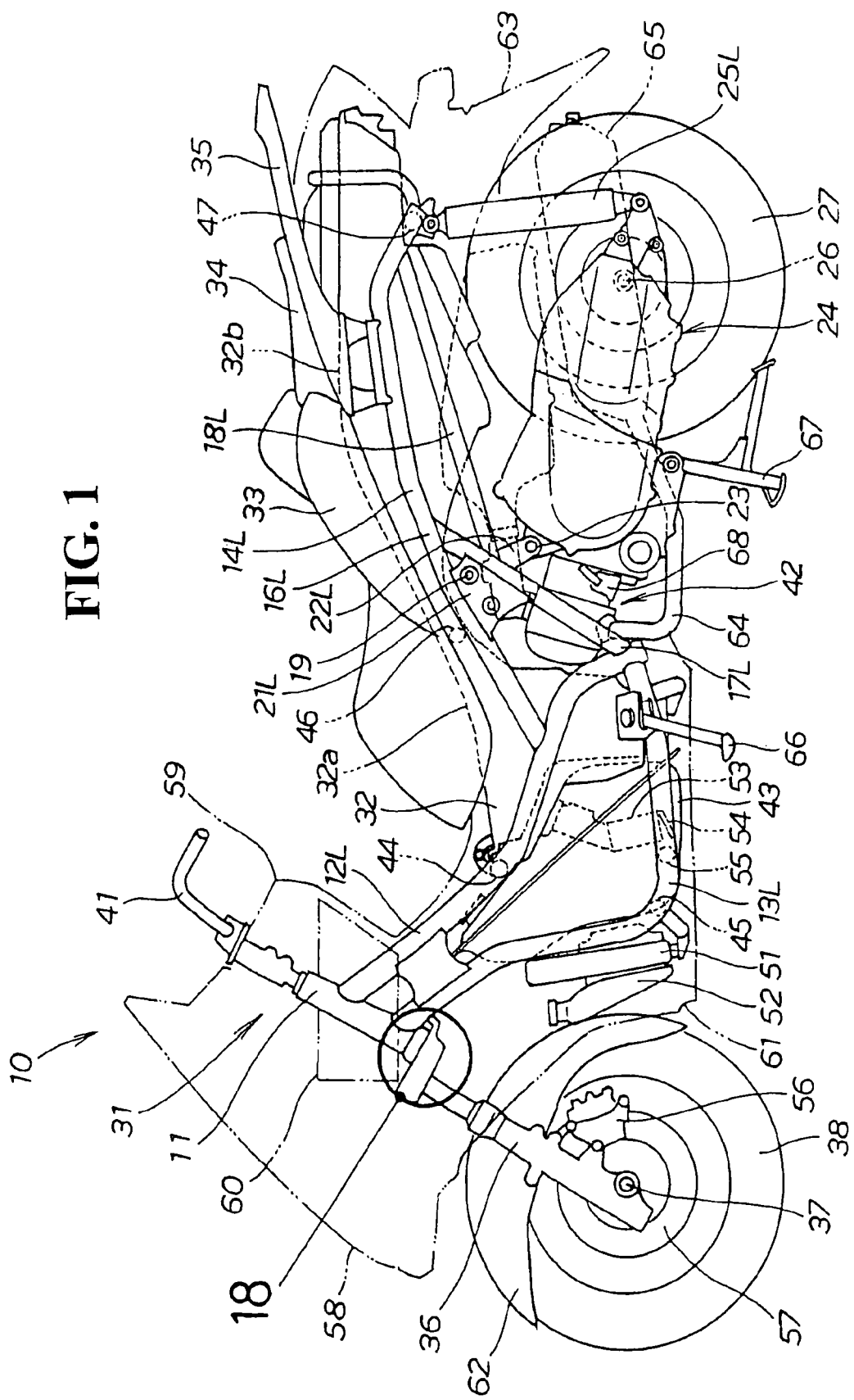
FIG. 1 is a left lateral view of a motorcycle according to the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 is a left lateral view of a motorcycle according to the present invention. A motorcycle 10 includes main frames 12L, 12R (only reference numeral 12L on the front side is shown) extending obliquely rearward and downwardly from the upper portion of a head pipe 11. Down frames 13L, 13R (only reference numeral 13L on the front side is shown) extend obliquely rearward and downwardly from the lower portion of the head pipe 1 and then toward the almost-downside, lastly rearward, and are joined to the corresponding main frames 12L, 12R. The motorcycle 10 further includes seat rails 14L, 14R (only reference numeral 14L on the front side is shown) extending obliquely rearward and downwardly from the corresponding rear portions of the main frames 12L, 12R. Middle frames 17L and 17R (only reference numeral 17L on the front side is shown) connect the intermediate points 16L and 16R (only reference numeral 16L on the front side is shown) of the seat rails 14L and 14R with the rear ends of the main frames 12L and 12R, respectively. The motorcycle 10 further includes rail stays 18L and 18R (only reference numeral 18L on the front side is shown) connecting the upper portions of the middle frames 17L and 17R with the rear portions of the seat rails 14L and 14R, respectively. Pivot plates 21L and 21R (only reference numeral 21L on the front side is shown) are spanned between the seat rail 18L and the middle frame 17L and between the seat rail 18R and the middle frame 17R, respectively, so as to support a pivot shaft 19. The motorcycle 10 further includes a link member 22L and 22R (only reference numeral 22L on the front side is shown) extending downward from the pivot plates 21L, 21R, respectively, via the pivot shaft 19. A power unit 24 extends rearward via the link member 22L, 22R and a support shaft 23 and also serving as a rear swing arm swingable up and down. The motorcycle 10 further includes a rear cushion unit 25L spanned between the rear end of the power unit 24 and the seat rail 14L. A rear wheel axle 26 is provided at the rear portion of the power unit 24 and also serves as a drive shaft. A rear wheel 27 is attached to the rear wheel axle 26. The motorcycle 10 further includes a storage box 32 mounted to the seat rails 14L, 14R as constituent elements of the body frame 31. A front seat 33 covers the front portion 32a of the storage box 32 and on which a rider sits. A rear seat 34 covers the rear portion 32b of the storage box 32 and on which a pillion passenger sits. A rear spoiler 35 surrounds the rear seat 34. The motorcycle 10 further includes a front fork 36 steerably attached to the head pipe 11 located on the front side. A front wheel 38 is attached to the front fork 36 via a front wheel axle 37. A steering handlebar 41 is attached to the upper end of the front fork 36. Incidentally, the power unit 24 includes an engine 42.

Members spanned between left and right frames will be described below.

A fuel tank 43 is disposed in an area defined by the main frames 12L, 12R and the down frames 13L, 13R. A first cross member 44 is spanned between the left and right main frames 12L, 12R and above the fuel tank 43. A second cross member 45 is spanned between the down frames 13L, 13R and below the fuel tank 43. A third cross member 46 is spanned between the left and right seat rails 14L, 14R and in the vicinities of the pivot plates 21L, 21R. A rear cross member 47 is spanned between the rear ends of the left and right seat rails 14L, 14R.

A radiator unit 51 adapted to cool the engine 42 is disposed rearward of the front wheel 38 and forward of the down frames 13L, 13R. A cooling liquid reservoir tank 52 is disposed close to the radiator unit 51. The radiator unit 51 and cooling liquid reservoir tank 52 will be described below.

The fuel tank 43 internally includes a fuel pump 53, a strainer 54 and a flow sensor 55. The strainer 54 is disposed below the fuel pump 53 to separate water and foreign matter such as dust from the fuel in the fuel tank 43. The flow sensor 55 detects the amount of the fuel in the fuel tank 43.

In the figure, reference numeral 56 identifies a front brake unit, reference numeral 57 identifies a front disk plate, and reference numeral 58 identifies a front cowl covering the front portion of the vehicle. Reference numeral 59 identifies an inner cover which covers the front portion of the vehicle including the head pipe 11 and which is provided continuously with the front cowl 58. Reference numeral 60 identifies a change box, reference numeral 61 identifies a main cowl covering the sides of the vehicle, reference numeral 62 identifies a front fender, reference numeral 63 identifies a rear fender, reference numeral 64 identifies an exhaust pipe extending from the power unit 24, reference numeral 65 identifies a silencer joined to the rear end of the exhaust pipe 64, reference numeral 66 identifies a side stand, reference numeral 67 identifies a main stand, and reference numeral 68 identifies a secondary air reed valve disposed on the side of the engine and connected to an intake pipe 77 described later.

Figure 2:
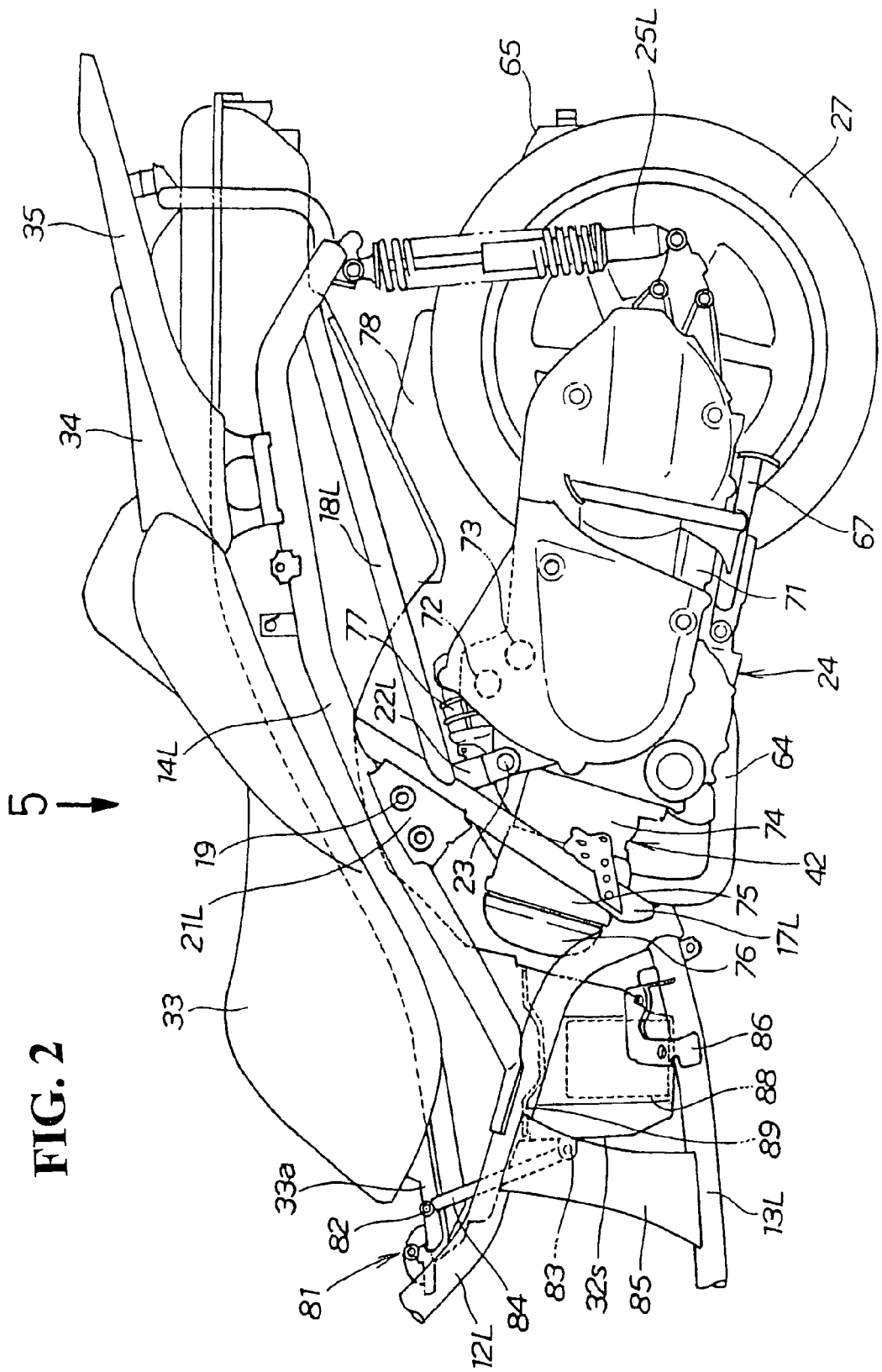
FIG. 2 is a left lateral view of the rear portion of the motorcycle according to the present invention.

FIG. 2 is a left lateral view of the rear portion of the motorcycle according to the present invention. The power unit 24 includes the engine 42, and is swingably mounted to the link member 22L via the support shaft 23. The power unit 24 includes a transmission unit 71 incorporating a belt type transmission and the engine 42 extending forward from the front end of the transmission unit 21. The transmission unit 71 incorporates at the front portion thereof an electronic transmission control motor 72 for controlling the belt type transmission and a starter motor 73.

The engine 42 is a single cylinder water-cooled 4-cycle engine in which a cylinder block 74, a cylinder head 75 and a cylinder head cover 76 are mounted to the transmission unit 71 in this order. An air cleaner unit 78 is connected to the upper surface of the cylinder head 75 via the intake pipe 77 and the exhaust pipe 64 is connected to the lower surface of the cylinder head 75.

A hinge portion 81 is connected to the front end of the storage box 32 and the front seat 33 is attached to the hinge portion 81 in an openable and closable manner. Ball joints 82 and 83 are provided at the front end 33a of the front seat 33 and at the front lateral surface 32s of the storage box 32, respectively. A dumper unit 84 is slantly spanned between the ball joints 82 and 83. Since the dumper unit 84 is provided between the front seat 33 and the storage box 32, the front seat 33 can smoothly be opened and closed.

In the figure, reference numeral 85 identifies a reinforcing plate spanned between the main frame 12 and the down frame 13, reference numeral 86 identifies a bracket used to attach the side stand 66 thereto, reference numeral 88 identifies a battery disposed in the lower portion of the storage box 32, and reference numeral 89 identifies a small lid disposed above the battery 88 to separate a battery chamber and the storage box. The small lid 89 is provided in an openable and closable manner. The battery chamber can store electric components such as e.g. a fuse box and the like as well as the battery 88. Since the small lid 89 is provided in an openable and closable manner, the electric components can be maintained with ease.

Figure 3:
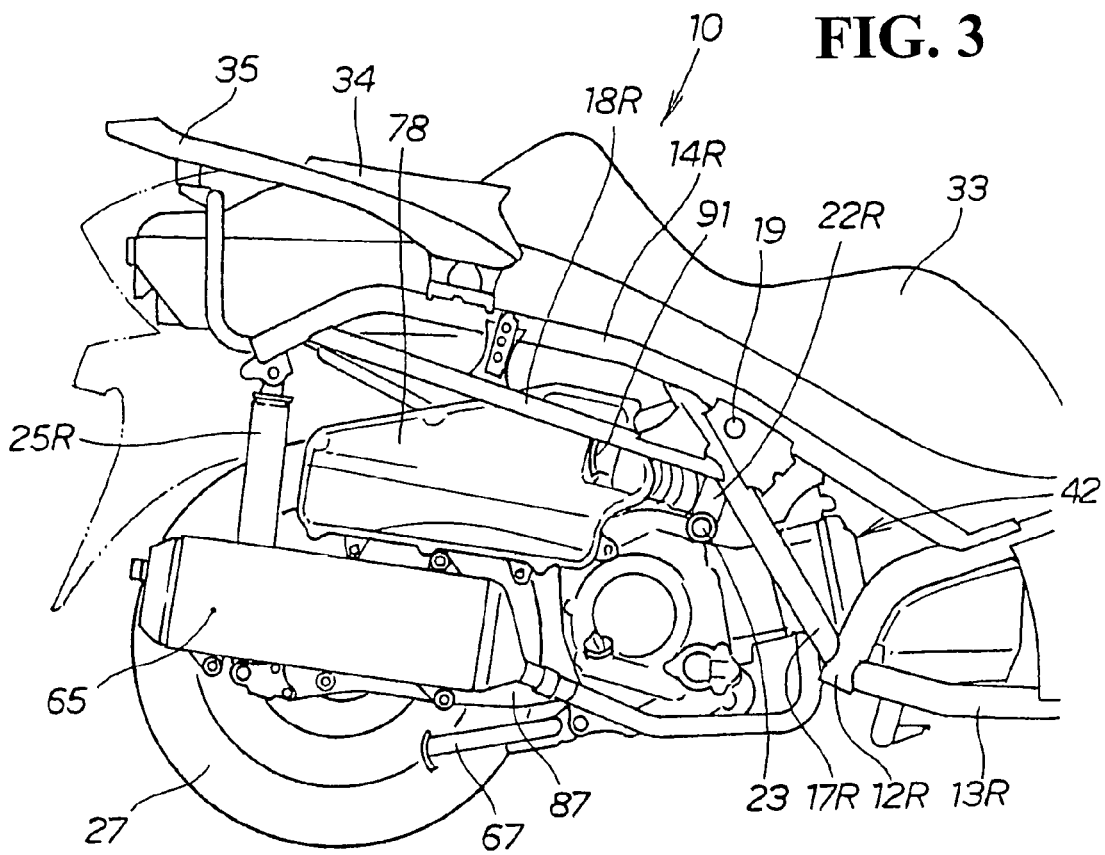
FIG. 3 is a right lateral view of the rear portion of the motorcycle according to the present invention.

FIG. 3 is a right lateral view of the rear portion of the motorcycle according to the present invention. The motorcycle 10 includes a rear swing arm 87 and a rear cushion unit 25R. The rear swing arm 87 extends rearward from the pivot shaft 19 through the link member 22R and support shaft 23 so as to be swingable up and down. The rear cushion unit 25R is spanned between the rear end of the rear swing arm 87 and the seat rail 14R.

The air cleaner unit 78 which purifies air to be supplied to the rear swing arm 87 is attached to the rear swing arm 87. An air suction port 91 of the air cleaner unit 78 is disposed at its front portion so as to face the front side and to be located forward of the silencer 65. Since the air suction port 91 is disposed forward of the silencer 65 to face the front side, it can be avoid to take in the air warmed by the silencer 65. In addition, it can be suppressed to suck foreign matter such as dust and mud thrown up by the rear wheel 27.

Figure 4:
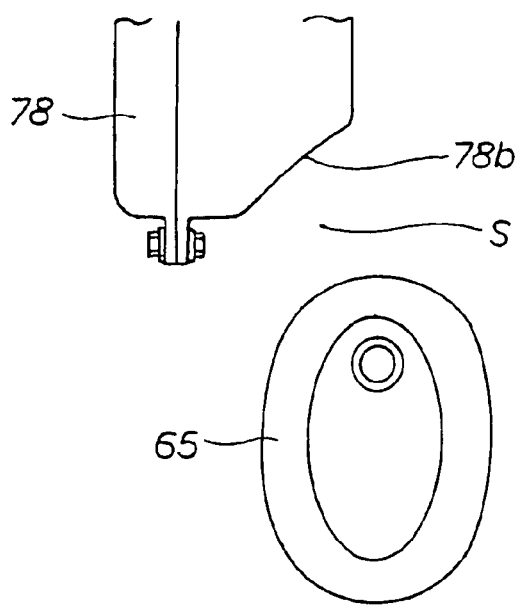
FIG. 4 is a diagram for assistance in explaining the fact that the bottom of an air clear unit is arranged to be offset from a silencer.

FIG. 4 is a diagram for assistance in explaining the fact that the bottom of the air clear unit is disposed to be offset from the silencer. The bottom 78b of the air cleaner unit 78 is disposed above the silencer 65. The bottom 78b of the air cleaner unit 78 is disposed to face the outside.

Since the air cleaner unit 78 is disposed to allow the bottom 78b to face the outside, the bottom 78b of the air cleaner unit 78 can be spaced apart from the silencer 65. Much air is passed through a space S between the bottom 78b and the silencer 65 to reduce the thermal influence of the silencer 65 on the air cleaner unit 78.

Figure 5:
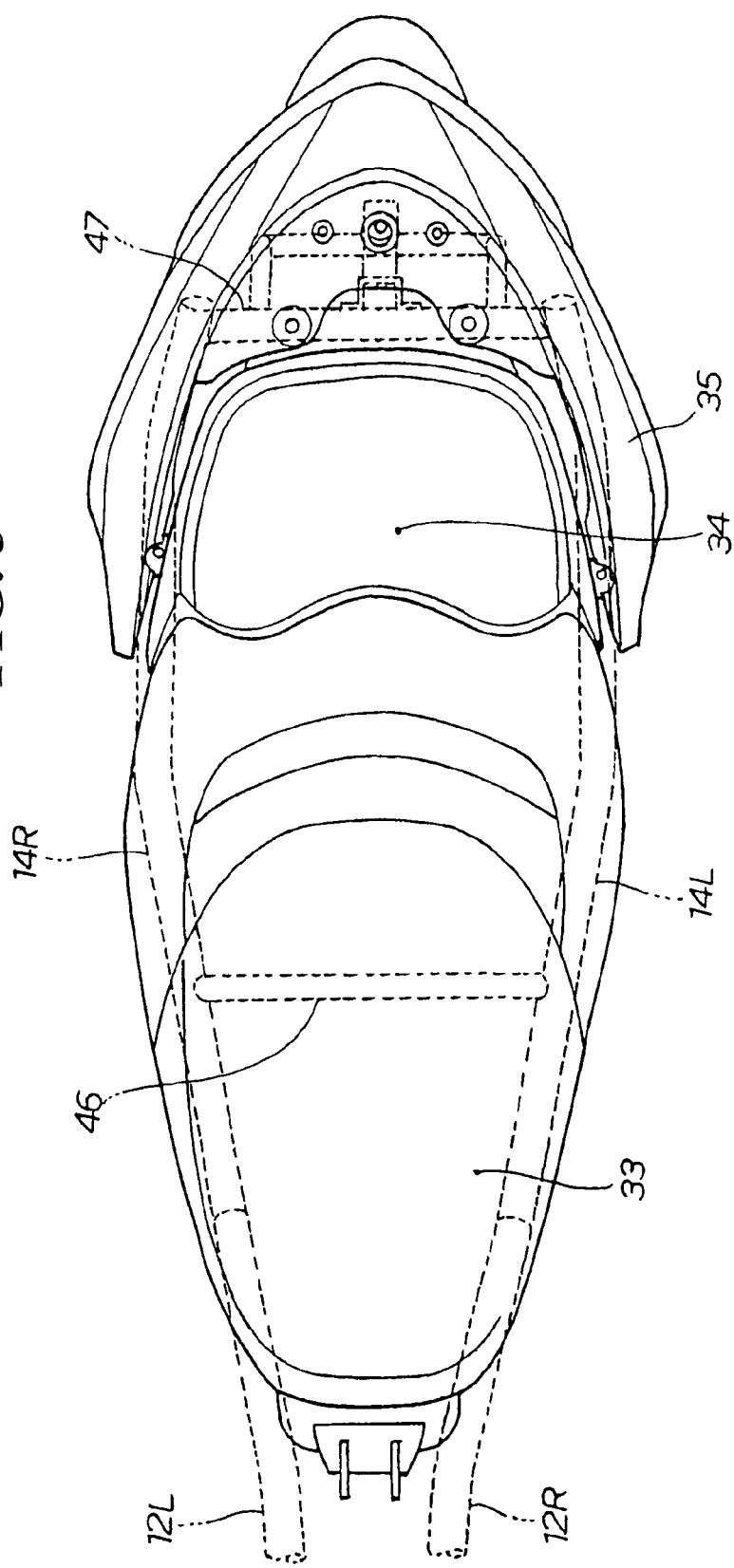
FIG. 5 is a diagram as viewed from arrow 5 of FIG. 2.

FIG. 5 is a diagram as viewed from arrow 5 of FIG. 2. The front seat 33 is mounted on the seat rails 14L and 14R located leftward and rearward, respectively, to extend from the front toward the rearward. The rear seat 34 is disposed rearward of the front seat 33 and the rear spoiler 35 is disposed to surround the rear seat 34.

Figure 6:
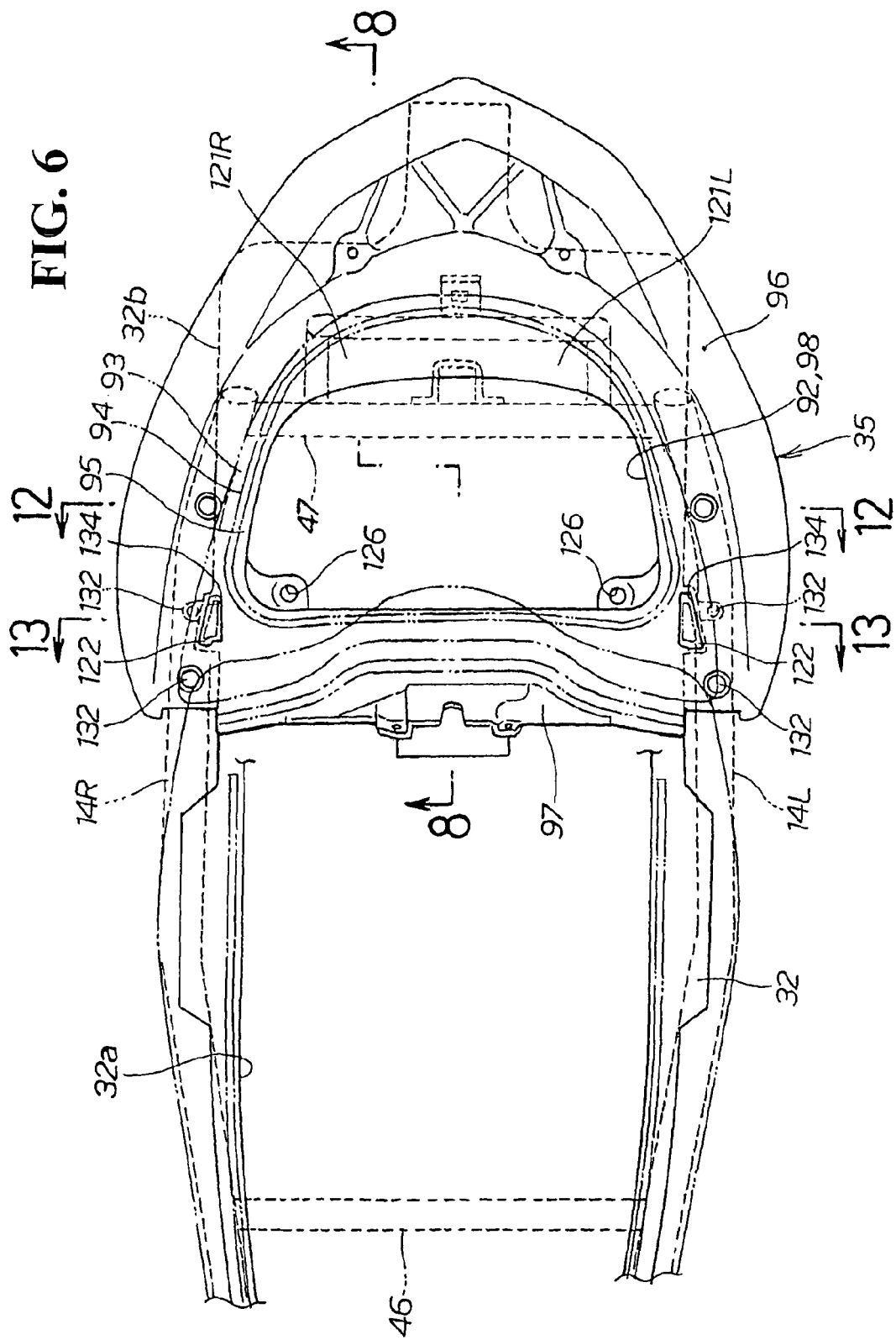
FIG. 6 is a plan view for assistance in explaining a rear seat-below opening portion and its peripheral portion.

FIG. 6 is a plan view for assistance in explaining a rear seat-below opening portion and its peripheral portion. The rear spoiler 35 has a generally rectangular opening formed therethrough (opening portion 92) as viewed from above. When the rear seat (reference numeral 34 in FIG. 5) is removed, since the opening portion 92 is provided below the rear seat 34, an article can be put in or taken out from the storage box 32 through the opening portion 92.

A first seal member 94 is provided on a bottom plate 93 of the rear seat to fully extend along the circumferential edge portion 95 of the rear spoiler 35 or of the opening portion 92. Therefore, the first seam member 94 is pressed against the circumferential edge portion 95 of the rear spoiler 35 to seal between the storage box 32 and the outside.

Since the upper surface wall above the storage box rear portion 32b can be eliminated to open the upper surface of the storage box rear portion 32b, the storage space of the storage box 32 can be enlarged.

More specifically, the rear spoiler 35 includes an almost-U-shaped portion 96 closed at its rear portion and a bridge portion 97 spanned between the front portions of the U-shaped portion 96. A rear seat-below opening portion 98 as an opening portion 92 is formed inside the U-shaped portion 96 and the bridge portion 97. The bottom plate 93 of the rear seat is provided with the first seal member 94 pressed against the rear seat-below opening portion 98 for seal.

Figure 7:
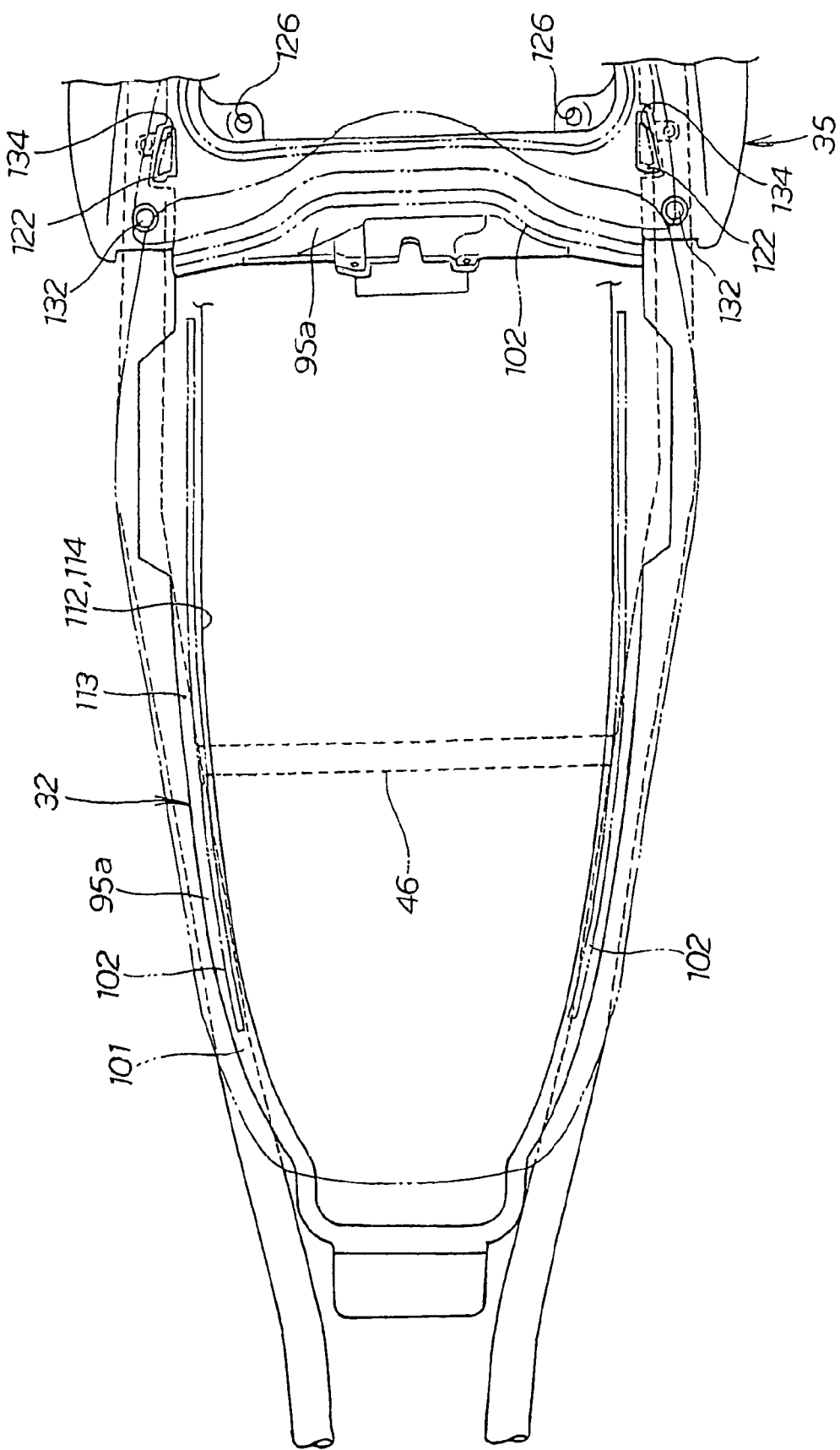
FIG. 7 is a plan view for assistance in explaining a front seat-below opening portion and its peripheral portion.

FIG. 7 is a plan view for assistance in explaining a front seat-below opening portion and its peripheral portion. A bottom plate 101 of the front seat is provided with second seal members 102. Among them, a second seal member 102 provided for the rear portion of the bottom plate 101 of the front seat is pressed against the front portion 95a of the circumferential edge portion 95 formed around the opening portion 92. Among them, second seal members 102, 102 provided for the left and right of the bottom plate 101 of the front seat are pressed against a front seat-below opening portion 114. Thus, the second seal members seal between the front seat 33 and the storage box 32.

The second seal members 102 are pressed against the front portion 95a of the circumferential edge portion 95 included in the front seat-below opening portion 114 and against the circumferential edge 113 formed at the opening 112 of the storage box to seal the front seat-below opening portion 114 as the opening 112 of the storage box.

The front portion 95a of the circumferential edge portion 95 provided in the rear spoiler 35 concurrently seals the rear portion of the front seat-below opening portion 114 and the front portion of the rear seat-below opening portion 98. Therefore, the seal structure of the storage box can be simplified.

Figure 8:
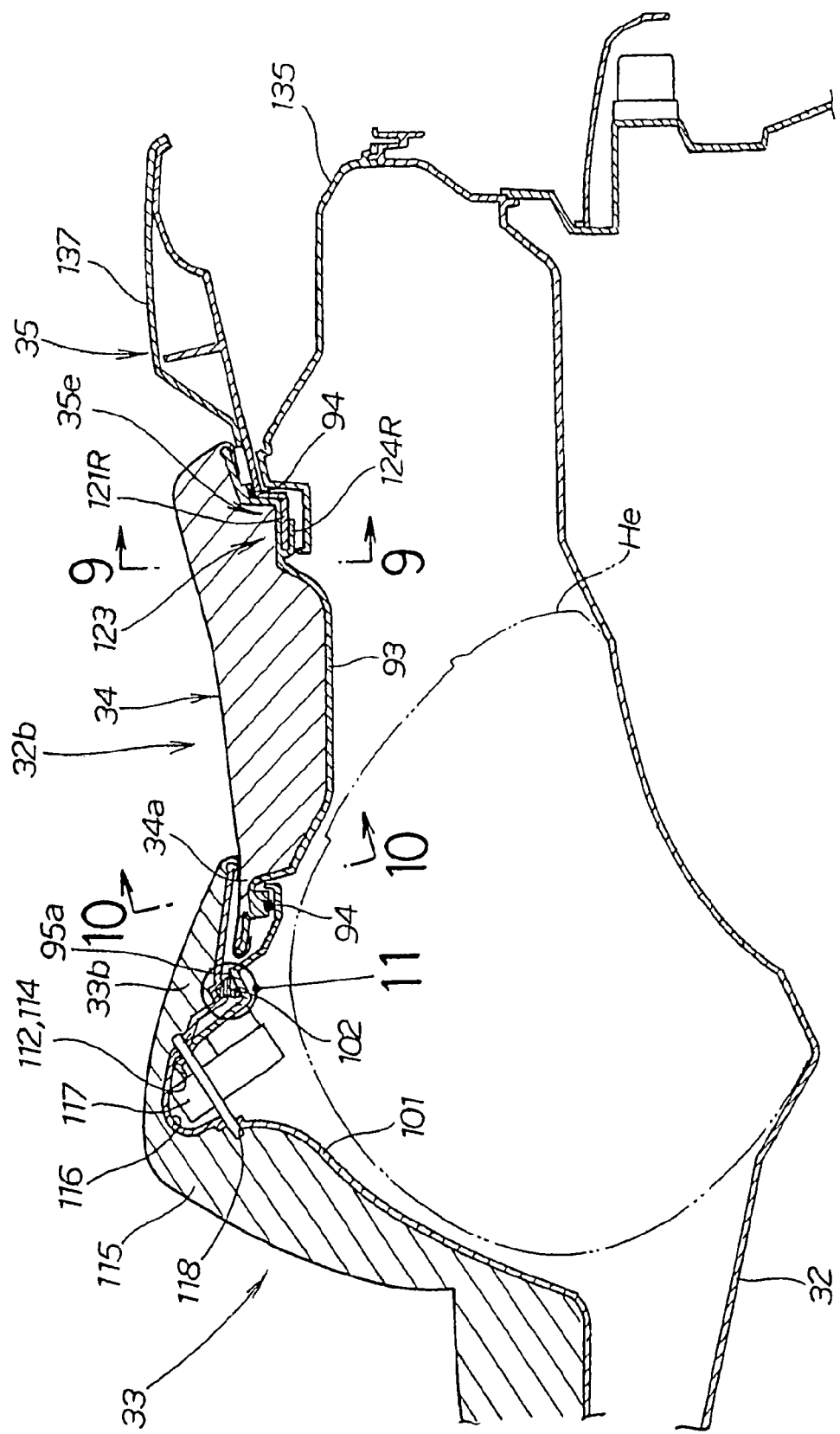
FIG. 8 is a cross-sectional view taken along line 8-8 of FIG. 6.

FIG. 8 is a cross-sectional view taken along line 8-8 of FIG. 6. The front seat 33 is provided at its rear portion with a backrest portion 115 as a back support protruding upward. The bottom plate 101 of the front seat is formed with a recessed portion 116 hollowed upwardly at a portion corresponding to the backrest portion 115. This recessed portion 116 receives therein a seat catch member 117 adapted to retain the front seat 33 on the vehicle side. The seat catch member 117 is disposed inside the second seal members 102 provided on the bottom plate 101 of the front seat so as to extend obliquely toward the maximum height position of the front seat 33. In the figure, reference numeral 118 identifies a lock bar adapted to secure the front seat 33 to the seat catch member 117.

The seat catch member 117 is disposed inside the second seal members 102 attached to the edge of the bottom plate 101 of the front seat. In other words, the second seal members 102 are disposed outside the seat catch member 117. The opening of the storage box 32 can be widened to the rearward to ensure the increased area of the front seat-below opening portion (reference numeral 114 in FIG. 7). Since the area of the opening portion of the front seat-below opening portion 114 is increased, an article can further easily be put in and taken out from the storage box.

The recessed portion 116 hollowed upwardly is formed at a portion corresponding to the backrest portion 115 and receives therein the seat catch member 117 adapted to retain the front seat 33 on the vehicle body side. Therefore, the recessed portion 116 of the backrest portion 115 which is a dead space can effectively be utilized, whereby the storage space of the storage box 32 can largely be ensured accordingly.

The rear portion 33b of the front seat 33 overlaps the front portion 34a of the rear seat and the first seal member 94 is partially disposed below this overlapping portion. This can further prevent foreign matter from entering the storage box 32.

Figure 9:
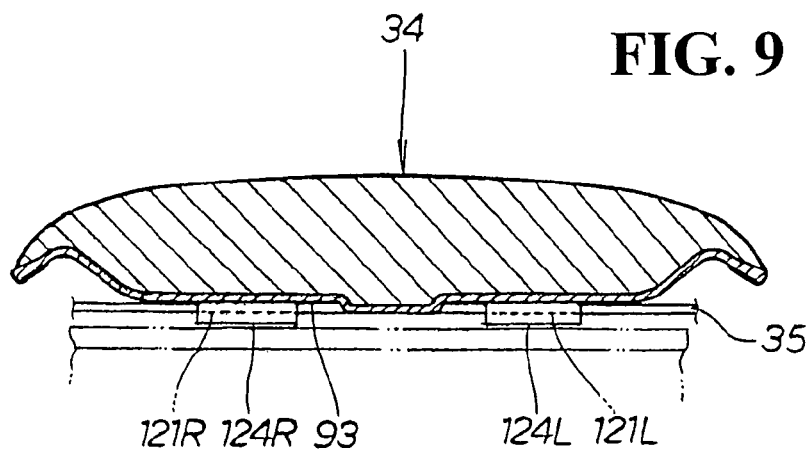
FIG. 9 is a cross-sectional view taken along line 9-9 of FIG. 8.

FIG. 9 is a cross-sectional view taken along line 9-9 of FIG. 8. In the figure, the bottom plate 93 of the rear seat is formed with two left and right extensions 124L, 124R extending rearward and the rear spoiler 35 is formed with two left and right engaging portions 121L, 121R. The extensions 124L and 124R are engaged with the engaging portions 121L and 121R, respectively.

The engagement of the rear seat 34 with the rear spoiler 35 permits the rear seat 34 to engage the storage box 32; therefore, it is not necessary to additionally provide members such as a rib and the like for the storage box 32. This can mount the rear seat 34 to the storage box 32 without reducing the storage space of the storage box 32.

Figure 10:
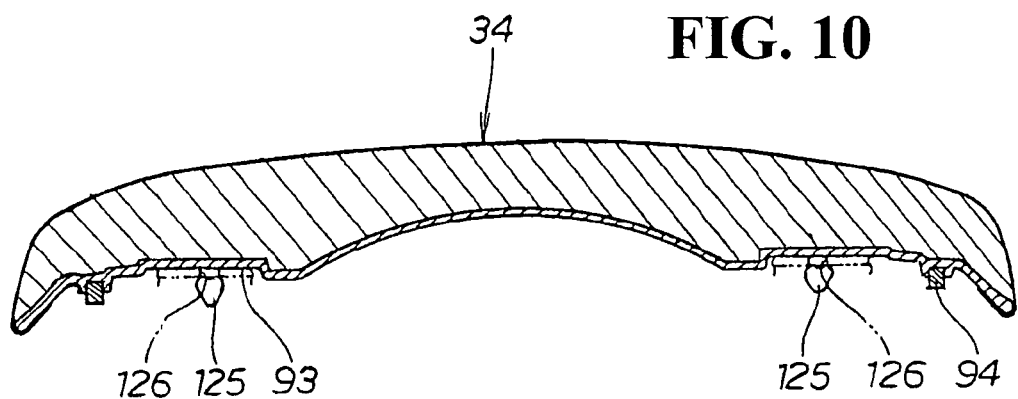
FIG. 10 is a cross-sectional view taken along line 10-10 of FIG. 8.

FIG. 10 is a cross-sectional view taken along line 10-10 of FIG. 8. In the figure, the bottom plate 93 of the rear seat is formed with two grommets 125, 125 serving as fasteners which project downwardly therefrom. The grommets are disposed inside the first seal member 94 arranged near the circumferential edge portion of the rear seat bottom plate 93. The grommets 125, 125 are each fitted to a corresponding one of fitting holes 126, 126 formed in the rear spoiler 35, thereby positioning the rear seat 34 on the vehicle side.

The first seal member 94 is provided outside the grommets 125, 125 and are pressed against the rear seat-below opening portion (reference numeral 98 in FIG. 6) to seal between the storage box 32 and the outside. The first seal member 94 is made of an elastically deformable sponge material.

Figure 11:
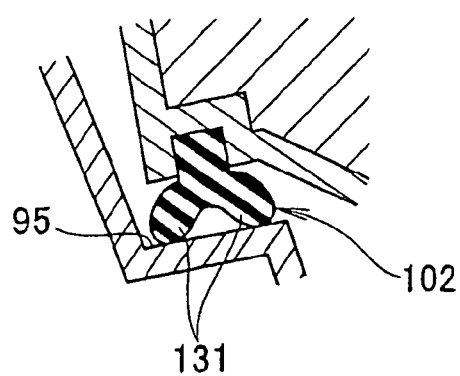
FIG. 11 is an enlarged view of a portion indicated with reference numeral 11 in FIG. 8.

FIG. 11 is an enlarged view of a portion denoted with reference numeral 11 in FIG. 8. The second seal member 102 is a lipping seal member configured to have a seal lip. Lip portions 102 come into contact with the circumferential edge portion 95 of the rear spoiler which is an abutting portion of the rear spoiler 35, thereby ensuring predetermined sealing performance. The second seal member 102 is provided with the seal portions 131. The abutment of the lip portions 131 against the circumferential edge portion 95 exhibits excellent sealing performance.

Referring again to FIG. 8, the second seal member 102 is provided for the front seat 33 which is frequently opened and closed. On the other hand, the first seal member 94 made of a convenient and inexpensive sponge material is provided for the rear seat 34 which is less frequently opened and closed than the front seat 33.

In this way, the front seat 33 and the rear seat 34 use the seal members with different specifications such as material and structure according to the open-close frequency. This makes it possible for each of the front seat 33 and rear seat 34 to ensure predetermined sealing performance while suppressing an increase in vehicle cost.

Figure 12:
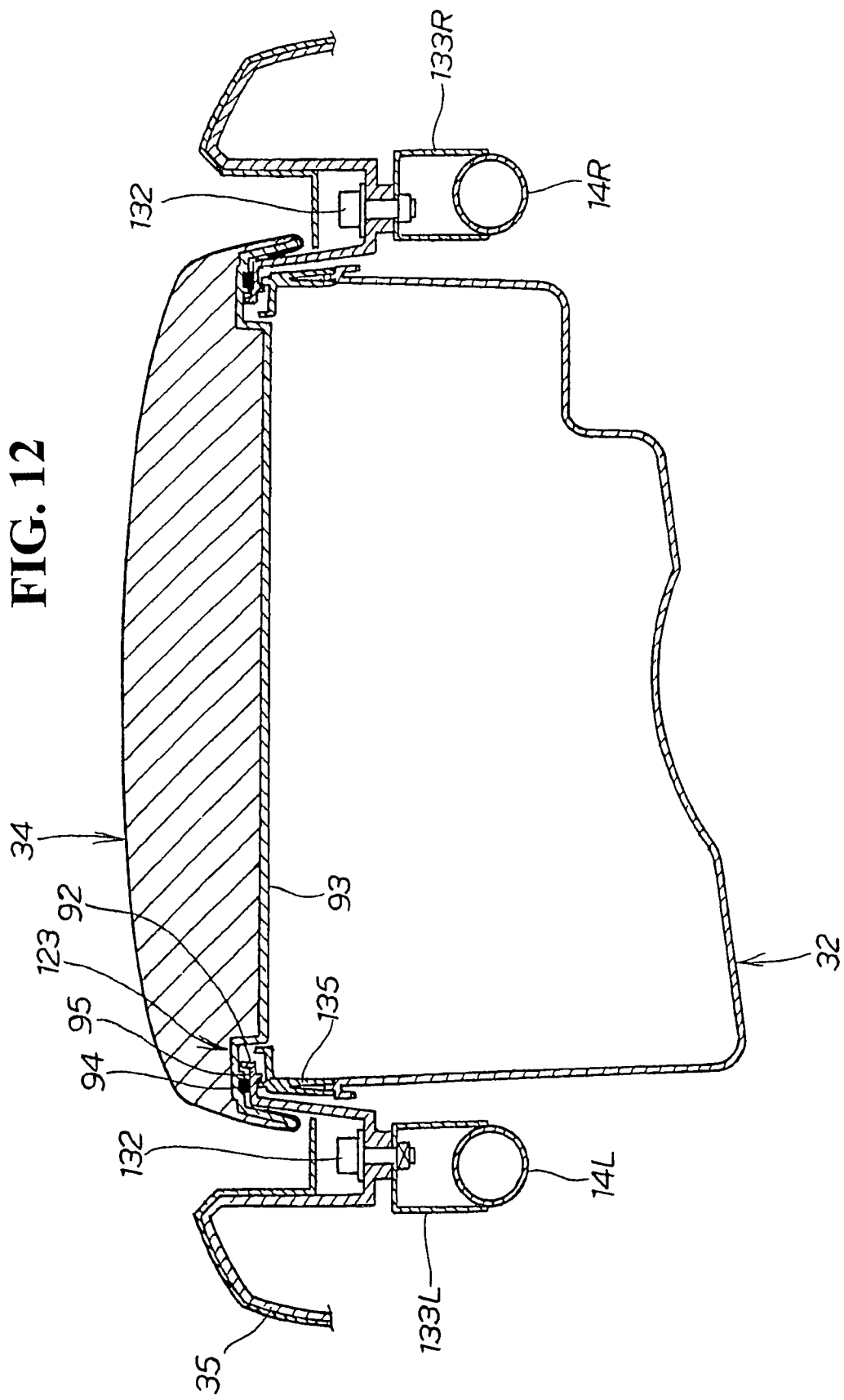
FIG. 12 is a cross-sectional view taken along line 12-12 of FIG. 6.

FIG. 12 is a cross-sectional view taken along line 12-12 of FIG. 6. The left and right front portions of the rear spoiler 35 are mounted to the left and right seat rails 141 and 14R via brackets 133L and 133R, respectively. In the figure, reference numeral 132 identifies a fastening member for securing the rear spoiler 35 to each of the brackets 133L, 133R.

As described above, the first member 94 is provided for the bottom plate 93 of the rear seat and is pressed against the circumferential edge portion 95 of the opening 92 to seal between the rear seat 34 and the rear spoiler 35.

In addition, a labyrinth structure 123 is arranged between the rear spoiler 35 and the bottom plate 93 of the rear seat so as to substantially overlap the first seal member 94 as viewed from above.

Specifically, the first seal member 94 seals between the bottom plate 93 of the rear seat and the rear spoiler 35 and the labyrinth structure 123 seals between the rear spoiler 35 and the storage box 32 and also between the bottom plate 93 of the rear seat and the rear spoiler 35. Thus, sealing performance between the rear seat 34 and the storage box 32 can effectively be enhanced.

Figure 13:
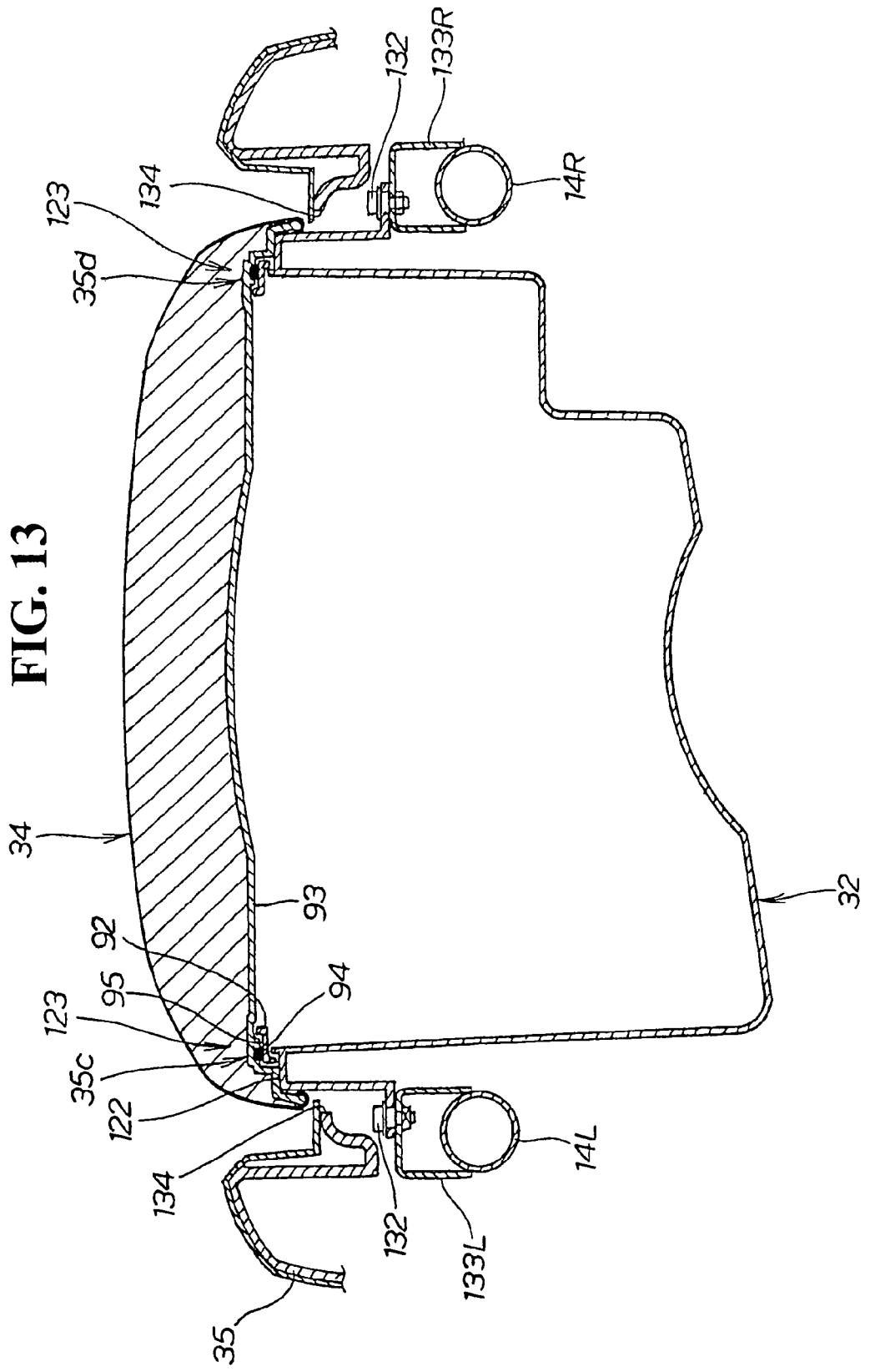
FIG. 13 is a cross-sectional view taken along line 13-13 of FIG. 6.

FIG. 13 is a cross-sectional view taken along line 13-13 of FIG. 6. The left and right front portions of the storage box 32 are mounted to the left and right seat rails 141 and 14R via box fastening members 132 and 132, and via the brackets 133L and 133R, respectively.

The storage box 32 is provided with rear seat support portions 122 adapted to support the load of the rear seat 34. The rear seat support portions 122 support the rear seat 34.

Specifically, the rear spoiler 35 is provided with through-holes 134, 134 in order to directly apply the load of the rear seat 34 to the rear seat support portions 122. A portion of the storage box 32 is allowed to face the through-holes 134, 134, forming the rear seat support portions 122, 122. The bottom plate 93 of the rear seat is abutted against the rear seat support portions 122, 122 to support the load of the rear seat 34.

Thus, it is not necessary for the rear spoiler 35 to receive the load of the rear seat 34, which simplifies the structure of the rear spoiler 35, suppressing an increase in the weight of the rear spoiler 35.

As described above, the first seal member 94 is provided for the bottom plate 93 of the rear seat and is pressed against the circumferential edge portion 95 of the opening portion 92 to seal between the rear seat 34 and the rear spoiler 35.

The labyrinth structure 123 seals between the storage box 32 and the rear spoiler 35. The first seal member 94 provided for the rear seat 34 seals between the rear spoiler 35 and the rear seat 34. In addition, the first seal member 94 is arranged to substantially overlap the labyrinth structure 123 as viewed from above and to extend closer to the center of the vehicle body than the rear seat support portion 122.

The labyrinth structure 123 is additionally provided between the storage box 32 and the rear seat 34 so as to substantially overlap the first seal member 94 as viewed from above. Therefore, not only the sealing performance between the storage box 32 and the rear spoiler 35 can be ensured but the sealing performance between the rear seat 34 and the rear spoiler 35 can further be enhanced. Thus, the sealing performance between the rear seat 34 and the storage box 32 can be enhanced.

Since the first seal member 94 is arranged to extend closer to the center of the vehicle body than the rear seat support portion 122, the sealing performance between the rear seat 34 and the storage box 32 while the storage box 32 supports the rear seat 34.

Referring again to FIG. 6, the bottom plate 93 of the rear seat 34 is abutted against the rear seat support portions 122, 122 provided for the storage box 32, the extensions (reference numerals 124L and 124R in FIG. 9) are engaged with the engaging portions 121L and 121R, respectively, and the grommets (reference numerals 125, 125 in FIG. 10) are engaged with the engaging holes 126, 126. Thus, the rear seat 34 can be mounted to the vehicle body side.

The rear spoiler 35 extends forward of the rear seat support portions 122, 122 supporting the rear seat 34 from below. The rear spoiler 35 as mentioned above is provided with the through-holes 134, 134 adapted to directly apply the load of the rear seat 34 to the rear seat support portions 122.

Since the rear spoiler 35 extends forward of the rear seat support portions 122, the external appearance of the vehicle can further be enhanced. The rear spoiler 35 is provided with the through-holes 134, 134 adapted to directly apply the load of the rear seat 34 to the rear seat 34. Therefore, the load of the rear seat 34 can be supported by components other than the rear spoiler 35 without impairing the external appearance of the vehicle. It is not necessary for the rear spoiler 35 to support the load of the rear seat 34; therefore, it is not necessary to increase the strength of the rear spoiler 35, which can reduce the weight of the rear spoiler 35.

Since the rear spoiler 35 is not provided with the rear seat support portion 122, preferably the rear spoiler 35 can more easily be replaced according to user's predilection as compared with the case where the rear spoiler 35 is provided with the rear support portion 122.

With reference to FIGS. 6 and 12, the engaging portions 121L, 121R are provided inside the first seal member 94, the rear seat support portions 122, 122 are provided outside the first seal member 94 and rearward of the vehicle body and the labyrinth structure 123 is provided near the first seal member 94. Thus, the stable sealing performance can be provided between the rear seat 34 and the storage box 32 along the entire circumference of the opening portion 92.

With reference to FIGS. 8 and 9, the rear spoiler 35 is provided with the engaging portions 121L and 121R engageable, respectively, with the extensions 124L and 124R extending rearward from the bottom plate 93 of the rear seat, additionally providing the labyrinth structure 123. Thus, the stable sealing performance can be provided between the rear seat 34 and the storage box 32.

Figure 14:
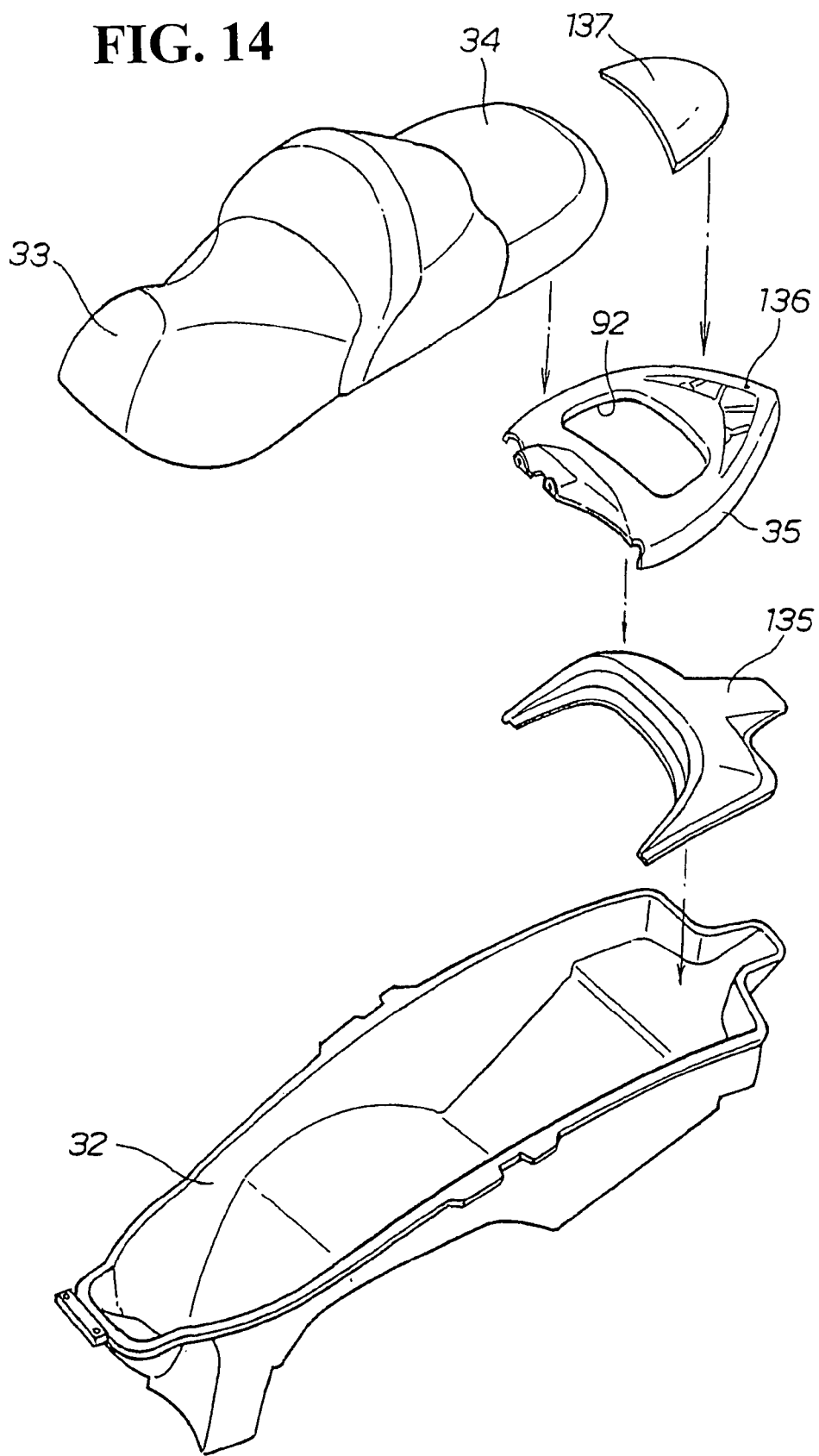
FIG. 14 is an exploded perspective view for assistance in explaining components attached to the storage box from above according to the present invention.

FIG. 14 is an exploded perspective view for assistance in explaining components attached to the storage box from above according to the present invention. The storage box 32 as a stuff box opening upward is provided and the front seat 33 connected to the front portion of the storage box 32 is disposed to openably close the storage box. A storage box cover 135 formed in an almost-U shape and closed at its rear portion as viewed from above is attached to cover the rear portion of the storage box 32. The rear spoiler 35 is disposed above the storage box cover 135 and the rear seat 34 is disposed above the rear spoiler 35 and rearward of the front seat 33. In short, the rear spoiler 35 is disposed between the storage box 32 and the rear seat 34.

The rear spoiler 35 is a foundry piece cast from light metal and its upper surface 136 is covered by a spoiler cover 137 also serving as a decorative cover except a portion against which the first seal member (reference numeral 94 in FIG. 6) is abutted.

Since the spoiler cover 137 also serving as a decorative cover is provided on the upper surface 136 of the rear spoiler 35, the background of the surface of the rear spoiler 35 is formed by casting, thereby improving the external appearance of the rear spoiler 35.

With reference to FIGS. 8, 12 and 13, since the rear spoiler 35 is formed by casting, even if the first seal member 94 is pressed against the circumferential edge portion 95, as the abutment portion, formed in the rear spoiler 35, the circumferential edge portion 95 can be made less deformable, thereby ensuring predetermined sealing performance.

The rear spoiler 35 is disposed above and close to the storage box 32 and the labyrinth structure 123 seals between the left portion 35c, right portion 35d and rear portion 35e of the rear spoiler and the storage box 32. Similarly, the labyrinth structure 123 seals between the left portion 35c and right portion 35d of the rear spoiler and the rear seat 34. Since the labyrinth structure 123 is disposed to substantially overlap the first seal member 94 as viewed from above, the sealing performance between the storage box 32 and the rear seat 34 can be ensured. Thus, the sealing performance of the storage box rear portion 32b can effectively be enhanced.

A description is next made of the motorcycle described above in which the rear spoiler is disposed on the periphery of the rear seat, which is provided with the opening portion.

Figure 15:
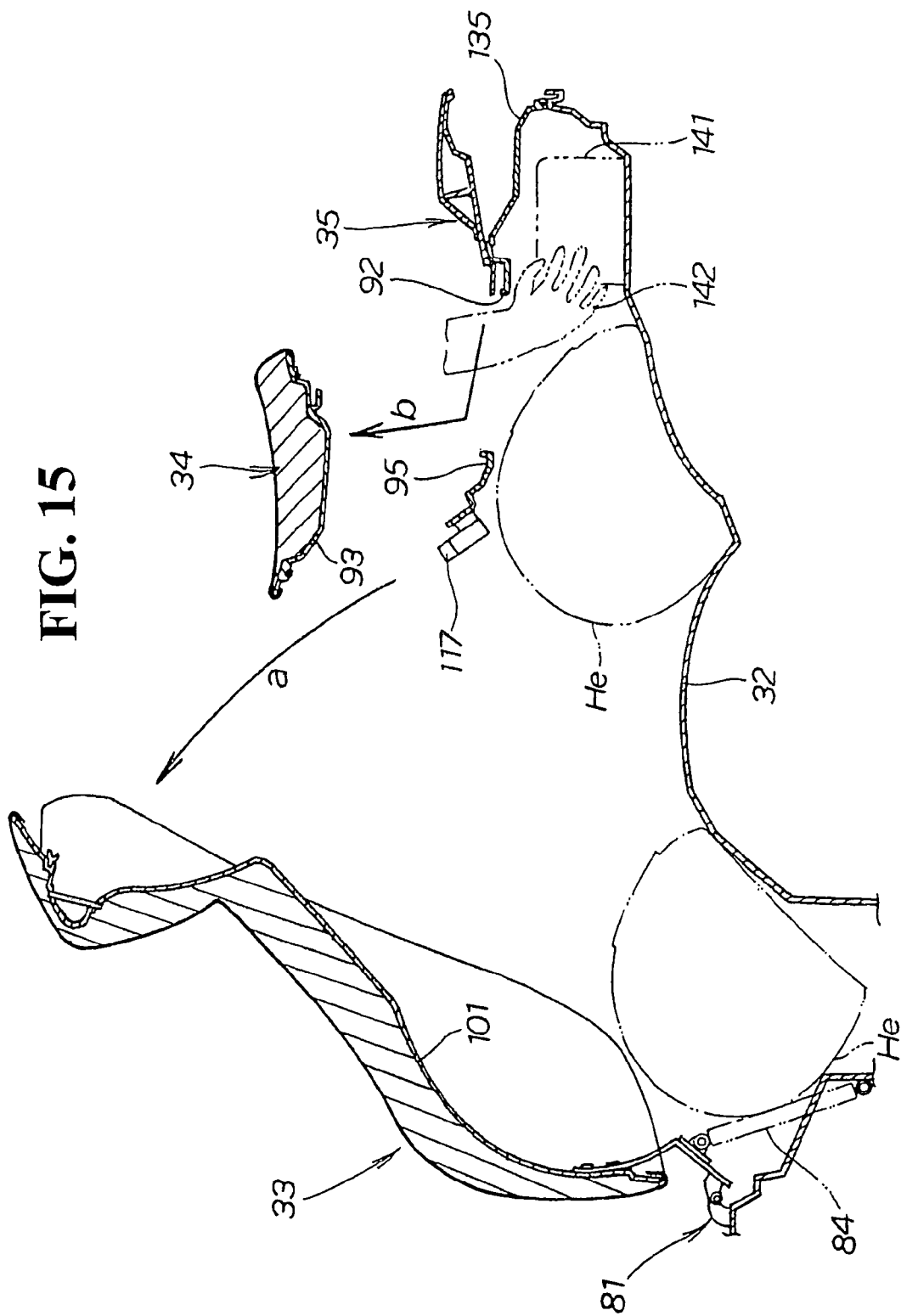
FIG. 15 is an operation diagram for assistance in explaining the fact that a front seat is provided on a storage box in an openable and closable manner and a rear seat is provided in a removable manner.

FIG. 15 is an operation diagram for assistance in explaining the fact that the front seat is provided on the storage box in an openable and closable manner and the rear seat is provided in a removable manner.

The rear spoiler 35 is provided with the opening portion 92. When the rear seat 34 is removed, an article 141 can be put in and taken out through the opening portion 92.

Specifically, the front seat 33 is raised with the hinge portion 81 as an axis in the direction of arrow "a" and next the rear seat 34 is removed in the direction of arrow "b". A hand 142 is inserted from above the opening portion 29 into the storage box 32 while confirming it. Thus, an article 141 stored below the rear seat 34 is identified and taken out or the article is put therein.

As described above, since the opening portion 92 is provided below the rear seat 34, identification of and taking in and out of the article 141 stored in the rear portion of the storage box 32 can be facilitated extremely easily. In the figure, symbol He identifies a helmet.

The first seal member 94 is provided on the bottom plate 93 of the rear seat to seal the opening portion 92 and pressed against the circumferential edge portion 95 of the opening portion 92 to seal between the rear seat 34 and the rear spoiler 35. This ensures the sealing performance for the opening portion 92.

A description will now be made of other structures specific to the motorcycle according to the present invention.

Figure 16:
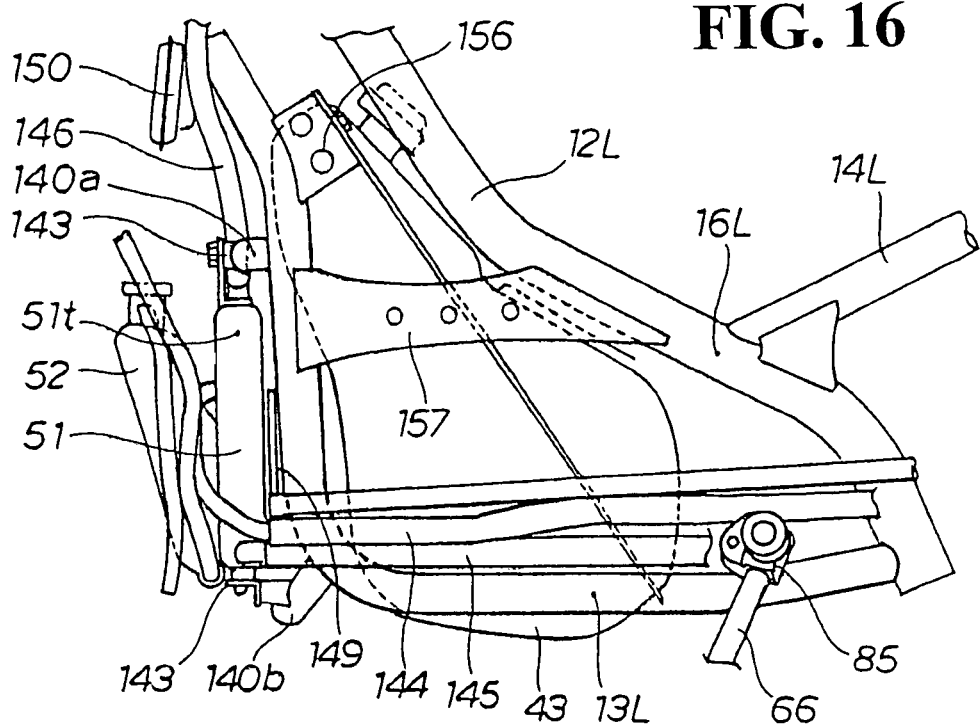
FIG. 16 is a lateral view of a radiator unit provided for the motorcycle according to the present invention.
Figure 17:
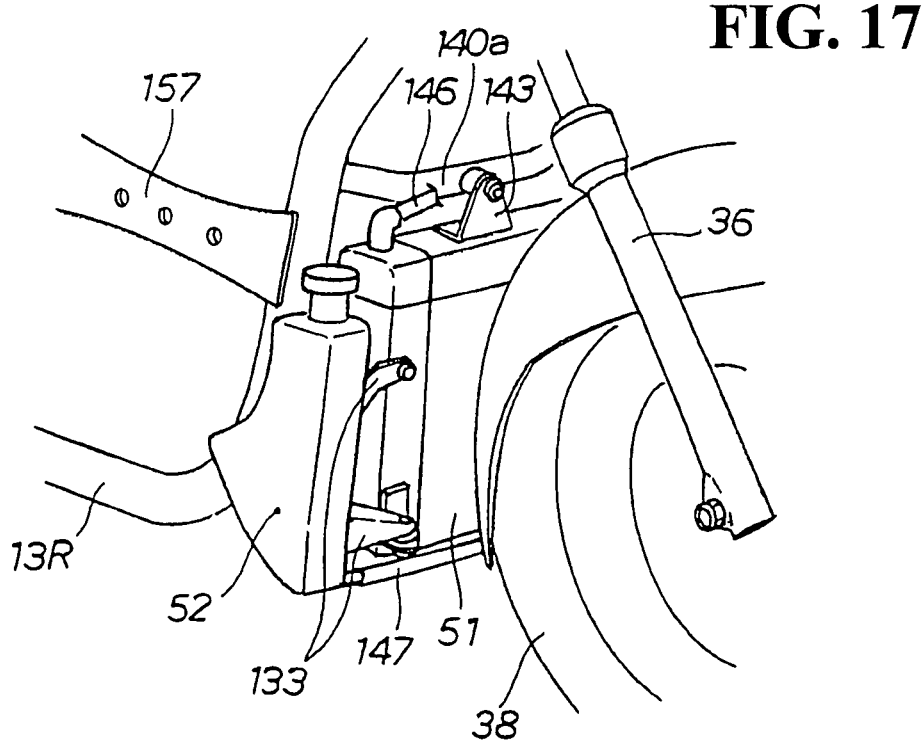
FIG. 17 is a perspective view of the radiator unit provided for the motorcycle according to the present invention.

FIG. 16 is a lateral view of a radiator unit provided for the motorcycle of the present invention and FIG. 17 is a perspective view of the radiator unit. The radiator unit is described with reference to FIGS. 16 and 17.

A cross pipe 140a is spanned between the upper portions of down frames 13L, 13R and similarly a cross pipe 140b is spanned between the lower portions thereof. Brackets portions 143 and 143 extend forward from the cross pipes 140a and 140b, respectively. A radiator unit 51 is mounted to the bracket portions 143, 143 so as to rise upright.

A return pipe 144 is disposed between the radiator unit 51 and the engine (reference numeral 42 in FIG. 2) to be adapted to return cooling liquid from the engine 42 and a supply pipe 145 is disposed therebetween to be adapted to supply the cooling fluid to the engine 42. A pipe 146 extends upward from the upper end portion 51t of the radiator unit 51. A sub-pipe 147 is connected to the pipe 146 and to the cooling fluid reservoir tank 52. If the cooling fluid is insufficient, cooling fluid is supplied to the radiator unit 51 through the sub-pipe 147.

A cooling fan 149 is attached to the rear surface of the radiator unit 51. When the radiator unit 51 rises in temperature, the fan 149 is rotated to control the temperature of the radiator unit 51 within a predetermined range.

During the travel of the vehicle, running air flowing from the front passes through the radiator unit 51 to cool it.

The cooling fluid reservoir tank 52 adapted to store excess cooling fluid therein is a tank disposed on the right side of the radiator unit 51 and is attached to the radiator unit 51 via small brackets 133, 133.

Since the cooling liquid reservoir tank 52 is disposed on the side of the radiator unit 51, a limited space in the vehicle can effectively be made full use of.

In the figure, reference numeral 150 identifies a horn unit for warning, reference numeral 156 identifies a first reinforcing member and reference numeral 157 identifies a second reinforcing member 157.

Figure 18:
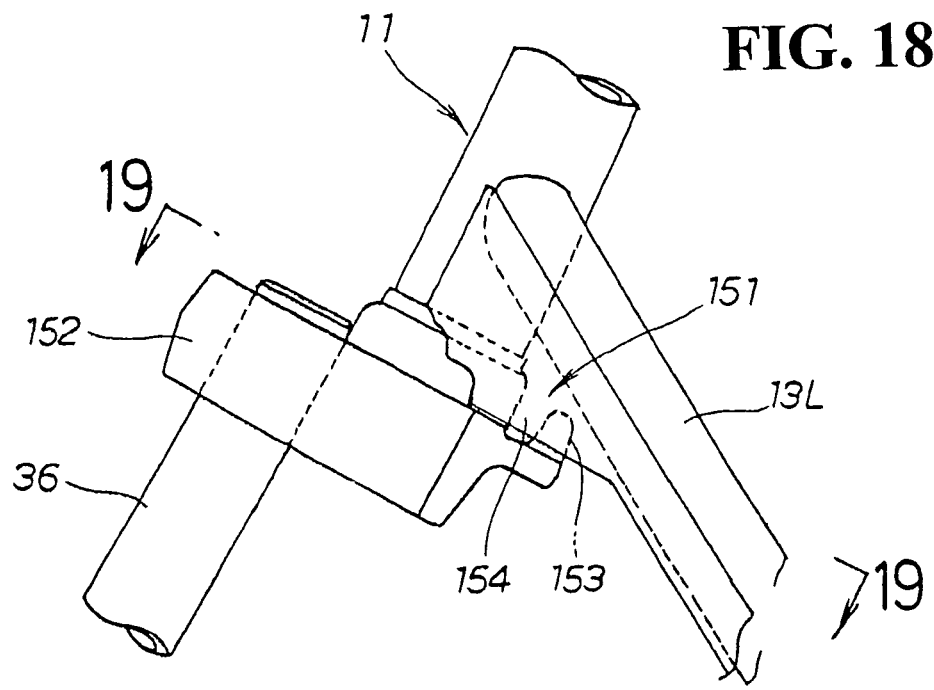
FIG. 18 is a perspective view of a reservoir tank provided for the motorcycle according to the present invention.

FIG. 18 is an enlarged view of a portion denoted with reference numeral 18 in FIG. 1. A turn restriction stopper 151 of the front fork 36 includes a claw stopper member 153 and plate-like gusset members 154, 154 (only reference numeral 154 on the front side is shown). The claw stopper member 153 extends upward from the rear upper surface of a bottom bridge 152. The gusset members 154, 154 extends from the respective joints between the head pipe 11 and down frames 13L, 13R (only reference numeral 13L is shown) along the down frames 13L, 13R.

Figure 19:
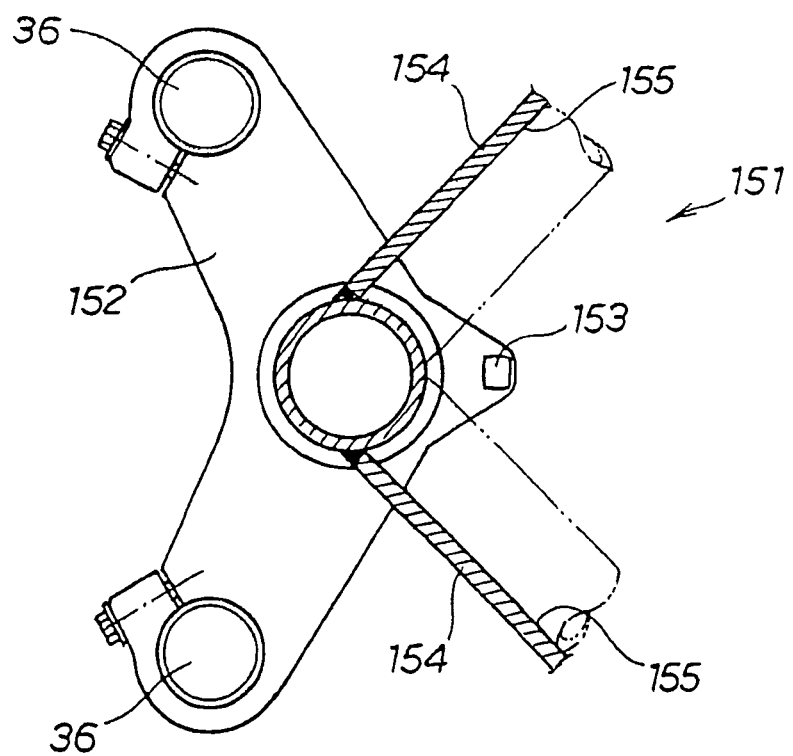
FIG. 19 is a cross-sectional view taken along line 19-19 of FIG. 18.

FIG. 19 is a cross-sectional view taken along line 19-19 of FIG. 18. The turn restriction stopper 151 prevents the steering handlebar 41 from turning at a predetermined angle or more by abutting the stopper member 153 against each of a pair of left and right abutment walls 155, 155, between each of the abutment walls 155, 155 and the stopper member 153. The abutment walls 155, 155 are formed on the inside surfaces of the gusset members 154, 154, respectively. The stopper member 153 is formed to extend upward from the bottom bridge 152.

The turn restriction stopper 151 configured as above can easily reduce the weight of the bottom bridge 152 as compared with the case where two stoppers are respectively provided on the left and right positions on the bottom bridge side.

Most of the stopper member 153 formed on the end of the bottom bridge 152 are covered by the left and right gusset members 154, 154 as viewed from the side. Therefore, the stopper member 153 can be made inconspicuous to enhance the external appearance of the vehicle.

Figure 20:
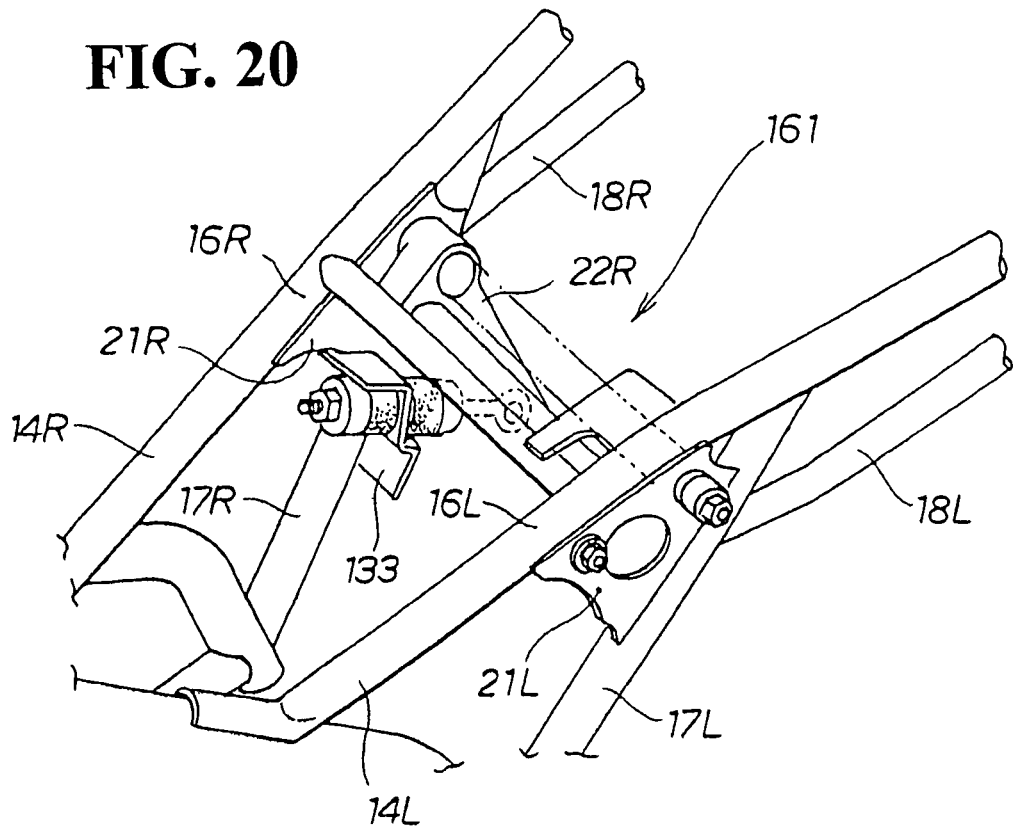
FIG. 20 is a perspective view for assistance in explaining a pivot portion of the motorcycle according to the present invention.
Figure 21:
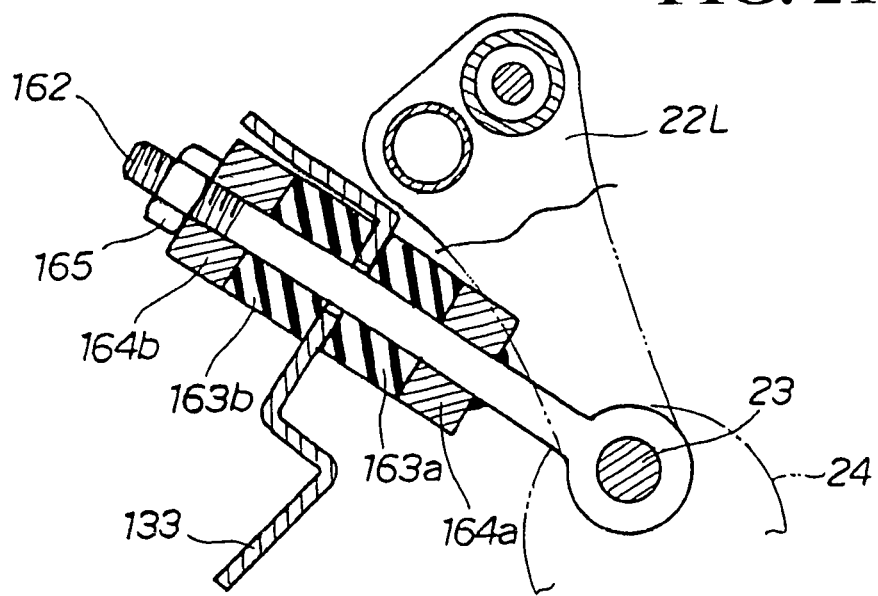
FIG. 21 is a cross-sectional view for assistance in explaining a mechanism for holding the pivot portion of the motorcycle according to the present invention.

FIG. 20 is a perspective view for assistance in explaining a pivot portion of the motorcycle according to the present invention. FIG. 21 is a cross-sectional view for assistance in explaining a mechanism for holding the pivot portion. The pivot portion is described below with reference to FIGS. 20 and 21.

A pivot portion 161 includes the pivot plates 21L, 21R and the left and right link members 22L, 22R (the left link member 22L is hidden in the figure) as main constituents. The pivot plate 21L is spanned between the left seat rail 14L and the middle frame 17L at a position near an intermediate point 16L of the seat rail 14L. The pivot plate 21R is arranged on the right side similarly to the pivot plate 21L arranged on the left side. The left and right link members 22L, 22R are provided between the left and right pivot plates 21L, 21R so as to be turnable around the pivot shaft 19. The pivot portion 161 supports the power unit 24 provided on the left side via the support shaft 23 spanned between the link members 22L, 22R and the rear swing arm (reference numeral 87 in FIG. 3) disposed on the right side.

A swing restriction shaft 162 adapted to restrict the up and down swing of the power unit 24 is provided to extend obliquely forward and upward of the vehicle from the support shaft 23. A plate-like bracket 133 is spanned between the seat rail 14R and the middle frame 17R. The swing restriction shaft 162 is attached to the bracket 133 through rubber bushings 163a, 163b.

Specifically, a washer 164a as a flange member is secured to the swing restriction shaft 162. The rubber bushing 163a, the bracket 133, the rubber bushing 163b and the washer 164b are inserted onto the swing restriction shaft 162 in this order and fastened with a nut member 165.

Figure 22:
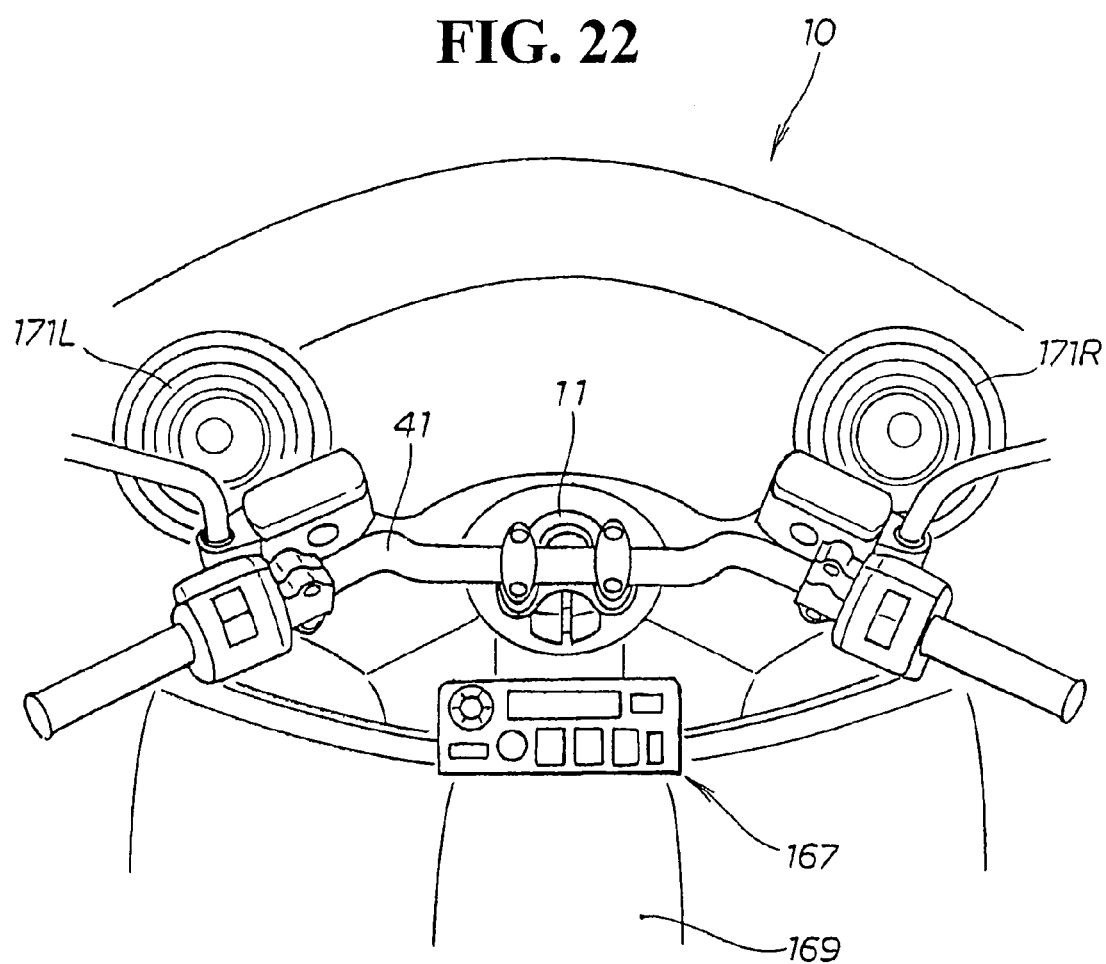
FIG. 22 is a perspective view for assistance in explaining an arrangement of an audio-operating unit included in the motorcycle according to the present invention.

FIG. 22 is a perspective view for assistance in explaining an arrangement of an audio-operating unit included in the motorcycle according to the present invention. An audio-operating portion 167 is installed above a cover member 169 provided at a straddle portion of the motorcycle and rearward of and close to the head pipe 11. Reference numerals 171L and 171R identify left and right speakers, respectively.

The audio-operating unit 167 is installed above the cover member 169 and rearward of and close to the head pipe 11; therefore, it can be disposed close to the steering handlebar 41 in a compact manner without an influence on the cover member 169.

Figure 23:
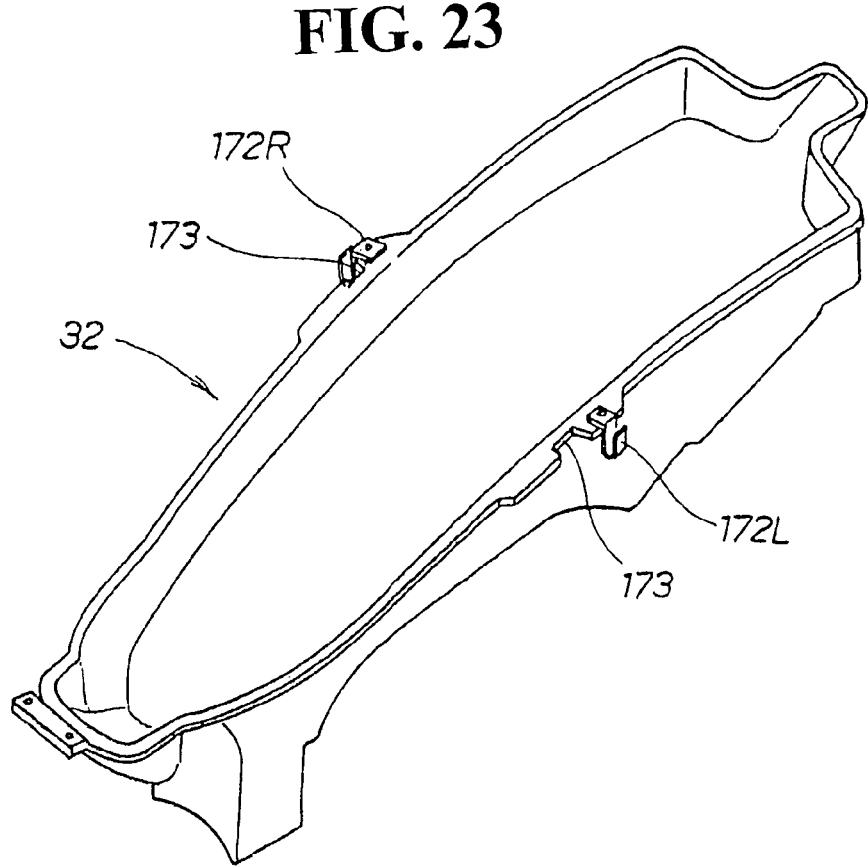
FIG. 23 is a perspective view of a storage box according to another embodiment.

FIG. 23 is a perspective view of a storage box according to another embodiment. A storage box 32 is provided at its upper edge portion with helmet hooks 172L, 127R close respectively to left and right notched portions 173, 173 receiving the load of the seat.

Conventionally, if a helmet hook is provided near a seat hinge and a helmet is hung on the helmet hook, then the helmet cannot be hung in some cases because of coming into contact with a floor tunnel as the straddle portion.

In the figure, since the helmet hooks 172L, 172R are provided close respectively to the left and right notch portions 173, 173, helmets can reliably hung on the helmet hooks 172L, 172R.

Figure 24:
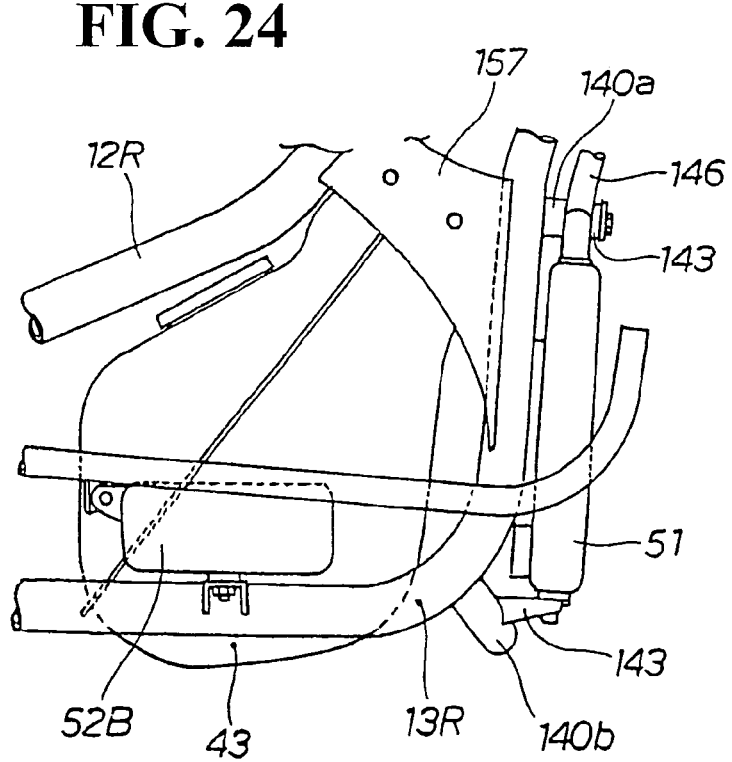
FIG. 24 illustrates another one of the embodiment show in FIG. 16.

FIG. 24 illustrates another one of the embodiment show in FIG. 16. This embodiment is different from that shown in FIG. 16 in that a cooling liquid reservoir tank 52B is disposed rearward of the radiator unit 51 and laterally to the fuel tank 43. The reservoir tank 52B is mounted to the down frame 13R.

Figure 25A:
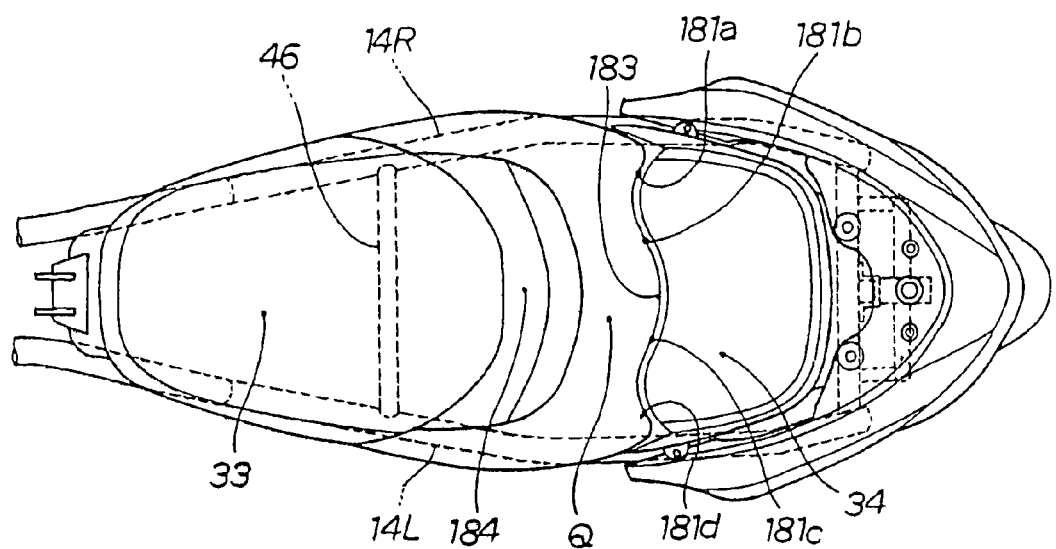
FIG. 25(a) and FIG. 25(b) include an embodiment view (FIG. 25(a)) and a comparative example view (FIG. 25(b)) for assistance in explaining a joint line between a front seat and a rear seat.
Figure 25B:
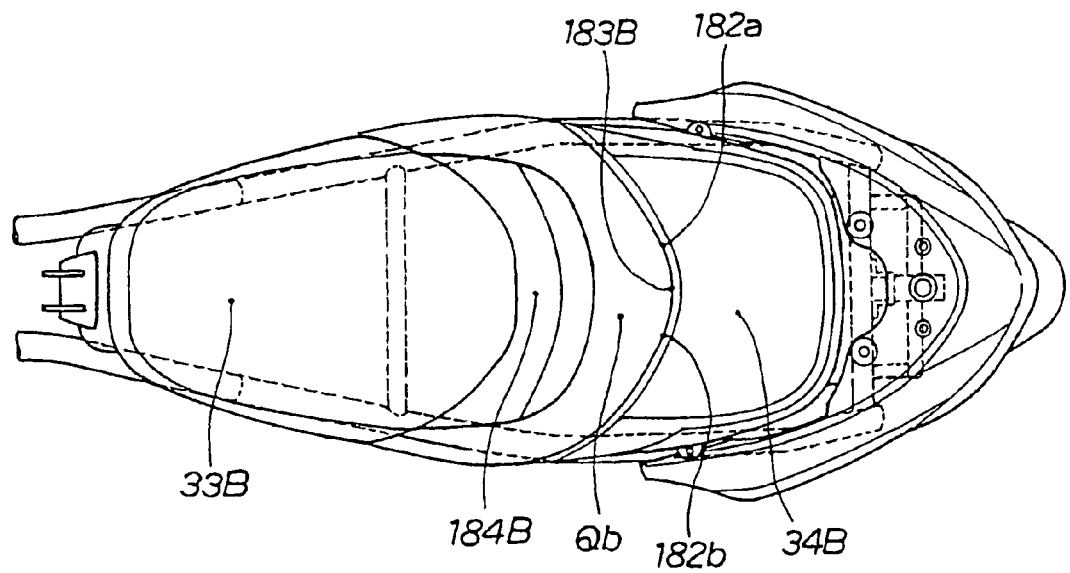

FIGS. 25(a) and FIG. 25(b) include an embodiment view and a comparative example view for assistance in explaining a joint line between a front seat and a rear seat.

FIG. 25(a) illustrates an embodiment, in which a joint line 183 is approximately W-shaped as viewed from above the vehicle between the front seat 33 and the rear seat 34. FIG. 25(b) illustrates a comparative example, in which a joint line 183B is approximately U-shaped between a front seat 33B and a rear seat 34B.

In FIG. 25(a), the front end portion of the rear seat 34, namely, four surfaces 181a to 181d having respective directions different from one another are abutted against the rear end portion of the front seat 33. In contrast, in FIG. 25(b), two surfaces 182a, 182b having respective directions different from each other are abutted against the front end portion of the rear seat 34B.

In this case, as the number of surfaces abutted against is increased, the play between the seats is more reduced, which makes the meshing between the front seat and the rear seat satisfactory. Accordingly, when closed, the seats in FIG. 25(a) become harder to shift from their predetermined positions from front to back and side to side than those in FIG. 25(b). Since each of the front seat 33 and the rear seat 34 becomes hard to shift from front to back and side to side, it can be positioned at its predetermined position further accurately.

When closed, the front seat 33 and the rear seat 34 become hard to shift from front to back and side to side and positioned at their predetermined positions accurately. Therefore, the sealing performance between the front seat 33 and the storage box (reference numeral 32 of FIG. 1) and the sealing performance between the rear seat 34 and the storage box 32 can further be stabilized. Since the sealing performance between each of the front and rear seats 33, 34 and the storage box 32 is further stabilized, the sealing performance of the storage box 32 can further be enhanced.

That is to say, the joint line 183 between the rear end portion of the front seat 33 and the front end portion of the rear seat 34 is formed in an approximate W-shape; therefore, the meshing of the front seat 33 with the rear seat 34 becomes satisfactory. Since the relative position between the seats is stabilized, the sealing performance between the storage box 32 and the seats can further be stabilized.

In the present embodiment, a backrest portion 184 is provided integrally with the rear portion of the front seat 33 so as to protrude upward.

In the present embodiment, the joint line 183 is provided with four different surfaces 181a to 181d, which are formed outwardly in the width direction of the vehicle as a whole, compared with the joint line 183B of the comparative example. Therefore, the upper surface Q of the backrest portion 184 can be formed as a single wide surface. This backrest portion 184 also has a function of being gripped by the pillion passenger's thighs when mounting on the vehicle. Since the upper surface Q of the backrest portion 184 is formed as the single wide surface, the pillion passenger's comfort can be enhanced to further enhance amenity.

Figure 26A:
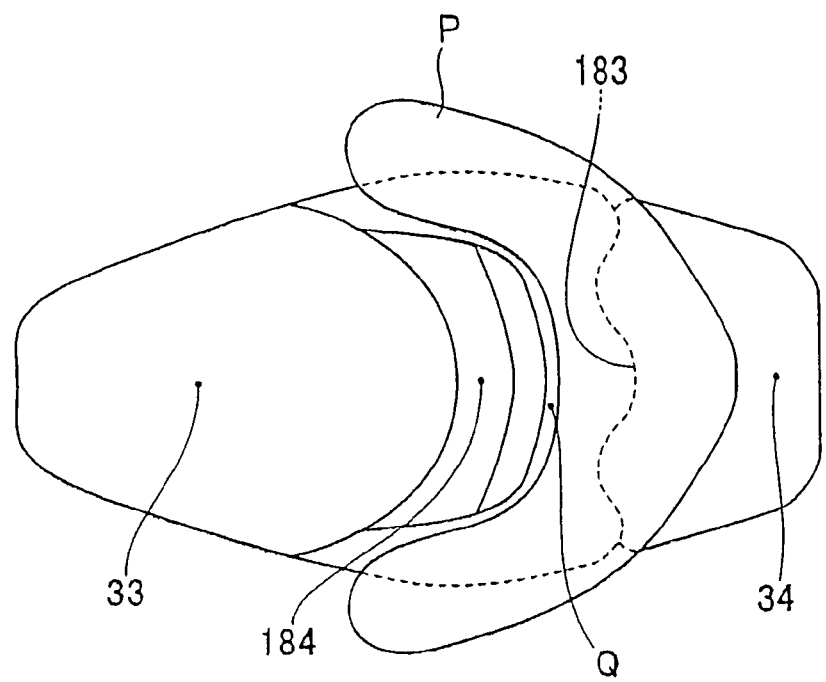
FIG. 26(a) and FIG. 26(b) are views for assistance in explaining an embodiment and a comparative example relative to occupant comfort encountered when a pillion passenger sits on the rear seat.
Figure 26B:
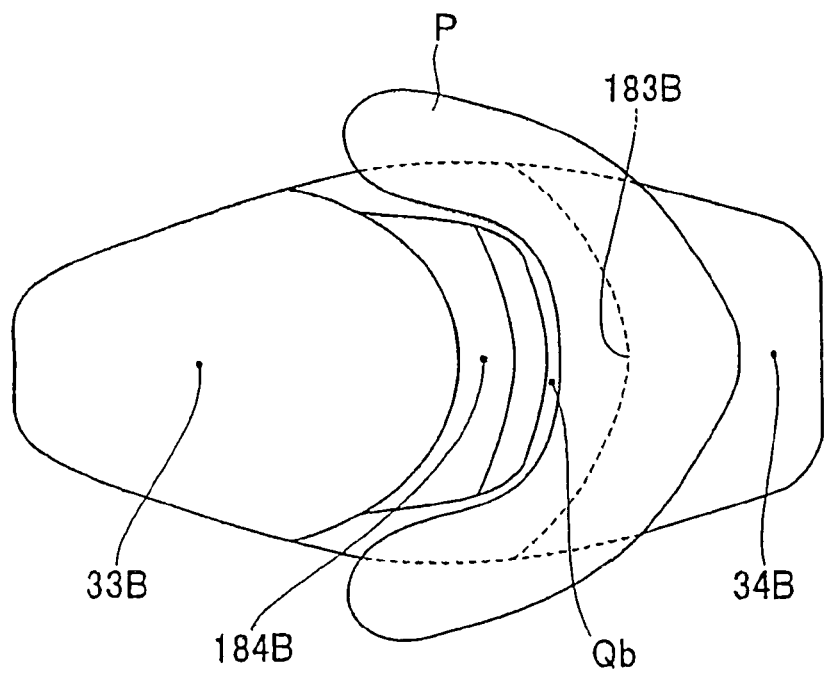

FIG. 26(a) and FIG. 26(b) are views for assistance in explaining the embodiment and comparative example relating to comfort encountered when a pillion passenger sits on the rear seat, illustrating the state where the pillion passenger P sits on the rear seat 34.

In FIG. 26(a), the upper surface Q of the backrest portion 184 has a large area. Thus, the pillion passenger P can put her or his thighs on the upper surface Q so that she or he can sit at ease.

In FIG. 26(b), the upper surface Qb of the backrest portion 184B has a smaller area than that of the embodiment. In this case, the pillion passenger P puts her or his thighs on the almost central position of the joint line 183B. There is room for improvement in comfort.

In short, according to the present invention, since the upper surface of the backrest is formed as a single surface, comfort for the pillion passenger is enhanced to further enhance amenity.

Incidentally, in claim 1, it is reasonable that the second seal member attached to the bottom plate of the front seat is configured not to be pressed against the front portion of the circumferential edge portion formed around the opening portion.

It is reasonable that the rear portion of the front seat is not placed on, that is, does not overlap the front portion of the rear seat, but is disposed to be continuous with or to be spaced apart from the rear portion of the front seat.

The material and structure of the first and second seal members may arbitrarily be selectable.

It is reasonable that the rear spoiler is not a foundry piece cast from light metal but may be made of FRP or other complex materials for instance.

The present invention is suitable for use in a motorcycle provided with a storage box below an occupant's seat.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
a body frame;
a storage box mounted to the body frame;
a front seat covering a front portion of the storage box;
a rear seat covering a rear portion of the storage box; and
a rear spoiler surrounding the rear seat;
wherein the rear spoiler has a generally rectangular through hole formed therethrough, the generally rectangular through hole is fully surrounded and defined by a circumferential edge portion of the rear spoiler, and when the rear seat is removed, an article can be put in and taken out of the storage box through the generally rectangular through hole from the storage box, and
a first seal member is attached to a bottom plate of the rear seat, and is pressed against the circumferential edge portion of the rear spoiler to thereby seal between the rear seat and the rear spoiler,
wherein a second seal member is attached to a bottom plate of the front seat, and is pressed against a front portion of the circumferential edge portion and against a circumferential edge formed around a through hole of the storage box to thereby seal between the front seat and the storage box.

2. The motorcycle according to claim 1, wherein the front seat is provided at a rear portion thereof with a backrest portion that projects upward, the bottom plate of the front seat is formed with a recessed portion that is hollowed upwardly at a portion corresponding to the backrest portion, the recessed portion receives therein a seat catch member adapted to retain the front seat to a vehicle side, and the seat catch member is disposed inside the second seal member so as to extend obliquely toward a maximum height position of the front seat.

3. The motorcycle according to claim 1, wherein a rear portion of the front seat overlaps the front portion of the rear seat and a portion of the second seal member is disposed below the overlapped portion.

4. The motorcycle according to claim 1, wherein the first seal member is made of an elastically deformable sponge material and the second seal member is a lipping seal member configured to have a seal lip.

5. The motorcycle according to claim 1, wherein the rear spoiler is a foundry piece cast from light metal and has an upper surface that is covered by a spoiler cover also serving as a decorative cover, except a portion against which the first seal member is abutted.

6. The motorcycle according to claim 1, wherein the rear spoiler surrounding the rear seat is disposed above and near the storage box, and a labyrinth structure seals between the storage box and each of a left portion, a right portion and a rear portion of the rear spoiler, and is disposed at a position substantially overlapping the first seal member as viewed from above.

7. The motorcycle according to claim 1, wherein a joint line between a rear end portion of the front seat and a front end portion of the rear seat is formed in an approximate W-shape as viewed from above.

8. The motorcycle according to claim 7, wherein the rear portion of the front seat is provided integrally with a backrest portion that protrudes upward.

9. The motorcycle according to claim 1, wherein the rear seat covers the generally rectangular through hole when the rear seat is attached to the motorcycle.

10. The motorcycle according to claim 1, wherein the bottom plate of the rear seat is located inside the rear portion of the storage box, and is below and through the generally rectangular through hole.

11. The motorcycle according to claim 1, wherein the bottom plate of the rear seat is formed with a left extension and a right extension extending rearward, the rear spoiler is formed with a left engaging portion and a right engaging portion, and the left and right extensions are respectively engaged with the left and right engaging portions.

12. A storage box arrangement for a vehicle comprising:
a storage box;
a rear seat covering a rear portion of the storage box; and
a rear spoiler surrounding the rear seat;

wherein the rear spoiler has a generally rectangular through hole formed therethrough, the generally rectangular through hole is fully surrounded and defined by a circumferential edge portion of the rear spoiler, and when the rear seat is removed, an article can be put in and taken out of the storage box through the generally rectangular through hole from the storage box, and a first seal member is attached to a bottom plate of the rear seat, and is pressed against the circumferential edge portion of the rear spoiler to thereby seal between the rear seat and the rear spoiler, wherein a second seal member is attached to a bottom plate of a front seat of the vehicle, and is pressed against a front portion of the circumferential edge portion and against a circumferential edge formed around a through hole of the storage box to thereby seal between the front seat and the storage box.

13. The storage box arrangement according to claim 12, wherein the front seat is provided at a rear portion thereof with a backrest portion that projects upward, the bottom plate of the front seat is formed with a recessed portion that is hollowed upwardly at a portion corresponding to the backrest portion, the recessed portion receives therein a seat catch member adapted to retain the front seat to a vehicle side, and the seat catch member is disposed inside the second seal member so as to extend obliquely toward a maximum height position of the front seat.

14. The storage box arrangement according to claim 12, wherein a rear portion of the front seat overlaps the front portion of the rear seat and a portion of the second seal member is disposed below the overlapped portion.

15. The storage box arrangement according to claim 12, wherein the first seal member is made of an elastically deformable sponge material and the second seal member is a lipping seal member configured to have a seal lip.

16. The storage box arrangement according to claim 12, wherein the rear spoiler is a foundry piece cast from light metal and has an upper surface that is covered by a spoiler cover also serving as a decorative cover, except a portion against which the first seal member is abutted.

17. The storage box arrangement according to claim 12, wherein the rear spoiler surrounding the rear seat is disposed above and near the storage box, and a labyrinth structure seals between the storage box and each of a left portion, a right portion and a rear portion of the rear spoiler, and is disposed at a position substantially overlapping the first seal member as viewed from above.

18. The storage box arrangement according to claim 12, wherein a joint line between a rear end portion of the front seat and a front end portion of the rear seat is formed in an approximate W-shape as viewed from above.

19. The storage box arrangement according to claim 18, wherein the rear portion of the front seat is provided integrally with a backrest portion that protrudes upward.

20. The storage box arrangement according to claim 12, wherein the rear seat covers the generally rectangular through hole when the rear seat is attached to the motorcycle.

21. The storage box arrangement according to claim 12, wherein the bottom plate of the rear seat is located inside the rear portion of the storage box, and is below and through the generally rectangular through hole.

22. The storage box arrangement according to claim 12, wherein the bottom plate of the rear seat is formed with a left extension and a right extension extending rearward, the rear spoiler is formed with a left engaging portion and a right engaging portion, and the left and right extensions are respectively engaged with the left and right engaging portions.

* * * * *